United States Patent
Furukawa

(10) Patent No.: US 11,349,641 B2
(45) Date of Patent: May 31, 2022

(54) INFORMATION PROCESSING DEVICE, INFORMATION PROCESSING METHOD, AND RECORDING MEDIUM

(71) Applicant: NEC Corporation, Tokyo (JP)

(72) Inventor: Ryo Furukawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 238 days.

(21) Appl. No.: 16/533,939

(22) Filed: Aug. 7, 2019

(65) Prior Publication Data

US 2020/0076583 A1    Mar. 5, 2020

(30) Foreign Application Priority Data

Aug. 29, 2018   (JP) .............................. JP2018-160678

(51) Int. Cl.
| | | |
|---|---|---|
| *H04L 9/08* | (2006.01) | |
| *G06F 21/62* | (2013.01) | |
| *H04L 9/32* | (2006.01) | |
| *G06F 21/60* | (2013.01) | |

(52) U.S. Cl.
CPC .......... *H04L 9/0819* (2013.01); *G06F 21/602* (2013.01); *G06F 21/6218* (2013.01); *H04L 9/0861* (2013.01); *H04L 9/0894* (2013.01); *H04L 9/3247* (2013.01)

(58) Field of Classification Search
None
See application file for complete search history.

(56) References Cited

U.S. PATENT DOCUMENTS

| | | | | |
|---|---|---|---|---|
| 2010/0281265 A1* | 11/2010 | Ogawa | .................. | H04L 9/0861 713/176 |
| 2012/0185683 A1 | 7/2012 | Krstic et al. | | |
| 2014/0325212 A1* | 10/2014 | Della Corte | ........ | G06F 21/6272 713/164 |
| 2019/0377886 A1* | 12/2019 | Roy | .................... | G06F 21/6209 |

FOREIGN PATENT DOCUMENTS

| | | |
|---|---|---|
| JP | H10-282881 A | 10/1998 |
| JP | 2009-103968 A | 5/2009 |
| JP | 2009-200990 A | 9/2009 |
| JP | 5703391 B2 | 4/2015 |

* cited by examiner

*Primary Examiner* — Brandon Hoffman
(74) *Attorney, Agent, or Firm* — Sughrue Mion, PLLC

(57) ABSTRACT

An information processing device which includes: a secure storage accessible by only trusted software, in which a first encryption key keeping unit keeping a first encryption key is configured inside an access limit area; a second encryption key construction unit constructing a second encryption key by consolidating a plurality of pieces of distributed information; a setup processing activation unit outputting the second encryption key constructed by the second encryption key construction unit in response to activation of a local device; and a software execution unit being executed as the trusted software, constructing a common encryption key by using the second encryption key acquired from the setup processing activation unit and the first encryption key acquired from the first encryption key keeping unit, and setting up an encrypted file system by using the constructed common encryption key.

10 Claims, 16 Drawing Sheets

Fig.4

| DISTRIBUTED INFORMATION MANAGEMENT DEVICE | DISTRIBUTED INFORMATION |
|---|---|
| DISTRIBUTED INFORMATION MANAGEMENT DEVICE 12-1 | Div(Enc(Ck_efs_edgeA, Ck1_edgeA), 3,1) |
| DISTRIBUTED INFORMATION MANAGEMENT DEVICE 12-2 | Div(Enc(Ck_efs_edgeA, Ck1_edgeA), 3,2) |
| DISTRIBUTED INFORMATION MANAGEMENT DEVICE 12-3 | Div(Enc(Ck_efs_edgeA, Ck1_edgeA), 3,3) |
| ... | ... |

| FILE | ENCRYPTED INFORMATION |
|---|---|
| FILE 1 | Enc(FILE 1, Ck_efs_edgeA) |
| FILE 2 | Enc(FILE 2, Ck_efs_edgeA) |
| FILE 3 | Enc(FILE 3, Ck_efs_edgeA) |
| FILE 4 | Enc(FILE 4, Ck_efs_edgeA) |
| FILE 5 | Enc(FILE 5, Ck_efs_edgeA) |
| FILE 6 | Enc(FILE 6, Ck_efs_edgeA) |
| FILE 7 | Enc(FILE 7, Ck_efs_edgeA) |
| ... | ... |

| EDGE IDENTIFIER | DISTRIBUTED INFORMATION |
|---|---|
| EDGE A | Sep(Enc(Ck_efs_edgeA, Ck1_edgeA), 5,3,1) |
| EDGE C | Sep(Enc(Ck_efs_edgeC, Ck1_edgeC), 5,3,2) |
| EDGE D | Sep(Enc(Ck_efs_edgeD, Ck1_edgeD), 5,3,1) |
| EDGE E | Sep(Enc(Ck_efs_edgeE, Ck1_edgeE), 5,3,4) |
| ... | ... |

Fig.13

| FILE | SIGNATURE INFORMATION |
|---|---|
| EFS ENCRYPTION KEY CONSTRUCTION UNIT | Sig(Hash(EFS ENCRYPTION KEY CONSTRUCTION UNIT), Pk_sig_edgeA) |
| ENCRYPTED FILE SYSTEM SETUP UNIT | Sig(Hash(ENCRYPTED FILE SYSTEM SETUP UNIT), Pk_sig_edgeA) |
| TRUSTED SOFTWARE 1 | Sig(Hash(TRUSTED SOFTWARE 1), Pk_sig_edgeA) |

INFORMATION PROCESSING DEVICE, INFORMATION PROCESSING METHOD, AND RECORDING MEDIUM

This application is based upon and claims the benefit of priority from Japanese Patent Application No. 2018-160678, filed on Aug. 29, 2018, the disclosure of which is incorporated herein in its entirety by reference.

TECHNICAL FIELD

The present invention relates to an information processing device, an information processing method, and a program. In particular, the present invention relates to an information processing device, an information processing method, and a program which protect information by utilizing a file system including an encrypted area.

BACKGROUND ART

Internet of things (IoT) enables to connect various things to the Internet, and enables collection of data by a thing, and actuation to a thing. In an IoT system, a computer called an edge which performs simple data processing is disposed between an IoT device associated with a thing, and a cloud.

Along with improvement in performance of a computer, even an edge are able to execute high-load data processing typified by artificial intelligence (AI). As a result, instantaneous data processing in an edge and instantaneous reflection to an IoT device are achieved. When an edge comes to execute various kinds of processing, data used in the processing, processed data, and a processing program itself become valuable information. Thus, high-level security is required for an edge as well. In particular, since a model of AI is learned with a great cost, outflow of the information may be a risk for a user of an IoT system. Since edges are distributedly arranged in a factory or a city, it is difficult to spend physical antitheft cost on all edges. Thus, when an edge is stolen, protection of information in the edge is required.

A terminal device such as a personal computer is protected by a technique such as hard disc encryption or an encrypted file system in such a way that information saved inside is not stolen. According to these techniques, by abstracting a method of accessing information encrypted in a layer of an operating system (OS), information can be accessed even when an application individually does not decrypt the information. Thus, both convenience and security are accomplished by using these techniques. However, in order to acquire a decryption key for decrypting encrypted information, these techniques need input of a key and a password by a manager, and distribution of a key by a management server.

PTL 1 (Japanese Patent No. 5703391) discloses a method of performing boot processing for a computer device having a storage medium which is encrypted by utilizing full disc encryption, and which stores an OS.

PTL 2 (Japanese Unexamined Patent Application Publication No. 2009-200990) discloses a secret information management system that does not previously let a manager (a third-party organization) know an encryption key, and can restrict an encryption key for recovering when a storage medium having a calculation function is lost.

PTL 3 (Japanese Unexamined Patent Application Publication No. 2009-103968) discloses a key generation device which generates an encryption key for encrypting and decrypting data shared by a plurality of terminal devices. By using a secret distribution method which generates a public key and a secret key and generates a set of distribution keys capable of generating the secret key from one set of the distribution keys composed of a first distribution key and a second distribution key, the device of PTL 3 generates a set of the first distribution key and the second distribution key for each of a plurality of terminal devices. The device of PTL 3 distributes each of the plurality of first distribution keys included in the generated sets of distribution keys to each of the plurality of terminal devices, distributes the public key to each of the terminal devices, and distributes the plurality of second distribution keys included in the plurality of sets of distribution keys to a storage server.

PTL 4 (Japanese Unexamined Patent Application Publication No. H10-282881) discloses a secret key distributed management method which distributedly registers a secret key of public key encryption, and restores the secret key by collecting a number of pieces of distributed registration information equal to or more than a certain number when the secret key needs to be restored in case of loss or for another reason. In the method of PTL 4, distributed registration information for generating a secret key of public key encryption is distributedly registered on a plurality of management devices.

When a system stops due to some factor, an edge constituting an IoT system is requested to recover by performing autonomous reactivation without requiring intervention by a manager. Thus, it is difficult to apply an existing technique that requires input by a manager, to an edge constituting an IoT system. Moreover, an IoT system is not necessarily utilized in only an environment in which a network from an edge to a management server operating on a cloud or the like is stably connectable. Thus, when connection to a management server is needed in order to recover a system, there is a problem that it becomes difficult to recover the system without being able to connect to a network.

The method of PTL 1 needs to receive a qualification certificate from a user at boot processing of a computer device having a storage medium encrypted by using disc encryption. Thus, a scheme of PTL 1 has a problem that input from a user is needed at boot processing of a computer device. Moreover, the method of PTL 1 has a problem that it is possible to activate an OS included in an encrypted storage medium, but it is not possible to set up in such a way that one area in an encrypted storage medium is accessible from a normal OS.

The system of PTL 2 needs a user calculator utilized by a user, in addition to an encrypted and secure storage medium, in order to generate a key for decrypting an encrypted storage medium. Thus, a scheme of PTL 2 has a problem that input of information via a user calculator which is not necessarily secure is needed in order to generate a key for decrypting an encrypted storage medium.

In the scheme of PTL 3, when decrypting encrypted shared data, a terminal device receives the encrypted shared data, information for first key restoration, and information for second key restoration generated by a storage server, from the storage server via a communication network. Thus, the scheme of PTL 3 has a problem that a system may be unable to continuously run under a condition of not being stably connected to a network.

In the method of PTL 4, distributed registration information for generating a secret key of public key encryption is distributedly registered on a plurality of management devices. Therefore, when restoring the secret key, a key generation device needs to collect the distributed registration information from the plurality of management devices.

Thus, the method of PTL 4 has a problem of being unable to decrypt the secret key if a network is disconnected when the key generation device collects the distributed registration information from the plurality of management devices. Additionally, the method of PTL 4 has a problem that encrypted information has a possibility of being surreptitiously seen when the key generation device generating a secret key is stolen.

SUMMARY

An example object of the present invention is to provide an information processing device which accomplishes both autonomous reactivation of an edge and encryption of information and enables secure and continuous running of an IoT system, without being stably connected to a network.

An information processing device according to an example aspect of the present invention includes: a secure storage which includes an access limit area accessible by only trusted software executed by a local device, and in which a first encryption key keeping unit keeping a first encryption key is configured inside the access limit area; a second encryption key construction unit which consolidates a plurality of pieces of distributed information via a local network from a plurality of distributed information management devices distributedly storing the plurality of pieces of distributed information for constructing a second encryption key being a common encryption key encrypted by the first encryption key, and constructs the second encryption key by using the plurality of pieces of consolidated distributed information; an encrypted file system including an encrypted area recording processing target data encrypted by the common encryption key; a setup processing activation unit which causes the second encryption key construction unit to construct the second encryption key in response to activation of a local device, acquires the second encryption key constructed by the second encryption key construction unit, and outputs the acquired second encryption key; and a software execution unit which is executed as the trusted software, acquires the second encryption key from the setup processing activation unit, acquires the first encryption key from the first encryption key keeping unit in line with acquisition of the second encryption key, constructs the common encryption key by using the first encryption key and the second encryption key, and sets up an encrypted file system by using the constructed common encryption key in such a way as to be accessible from any software.

An information processing method according to an example aspect of the present invention includes: by an information processing device, consolidating, in response to activation of a local device, a plurality of pieces of distributed information via a local network from a plurality of distributed information management devices distributedly storing the plurality of pieces of distributed information for constructing a second encryption key being a common encryption key encrypted by a first encryption key; constructing the second encryption key by using the plurality of pieces of consolidated distributed information; causing trusted software to acquire, in line with construction of the second encryption key, the first encryption key kept in a first encryption key keeping unit inside an access limit area accessible by only trusted software executed by a local device; causing the trusted software to construct the common encryption key by using the acquired first encryption key and second encryption key; and causing the trusted software to set up, by using the common encryption key, an encrypted file system including an encrypted area recording processing target data encrypted by the common encryption key in such a way as to be accessible from any software.

A program according to an example aspect of the present invention causes a computer to execute: processing of consolidating, in response to activation of a local device, a plurality of pieces of distributed information via a local network from a plurality of distributed information management devices distributedly managing the plurality of pieces of distributed information for constructing a second encryption key being a common encryption key encrypted by a first encryption key; processing of constructing the second encryption key by using the plurality of pieces of consolidated distributed information; processing of acquiring, in line with construction of the second encryption key, the first encryption key kept in a first encryption key keeping unit inside an access limit area accessible by only trusted software executed by a local device; processing of causing the trusted software to construct the common encryption key by using the acquired first encryption key and second encryption key; and processing of causing the trusted software to set up, by using the common encryption key, an encrypted file system including an encrypted area recording processing target data encrypted by the common encryption key in such a way as to be accessible from any software.

BRIEF DESCRIPTION OF THE DRAWINGS

Exemplary features and advantages of the present invention will become apparent from the following detailed description when taken with the accompanying drawings in which:

FIG. 4 is a conceptual diagram illustrating one example of distributed information consolidated by a second encryption key construction unit of the information processing device according to the first example embodiment of the present invention;

FIG. 13 is a diagram illustrating one example of signature information stored in a trusted software signature storage unit of the information processing device according to the second example embodiment of the present invention;

EXAMPLE EMBODIMENT

Figure 1:
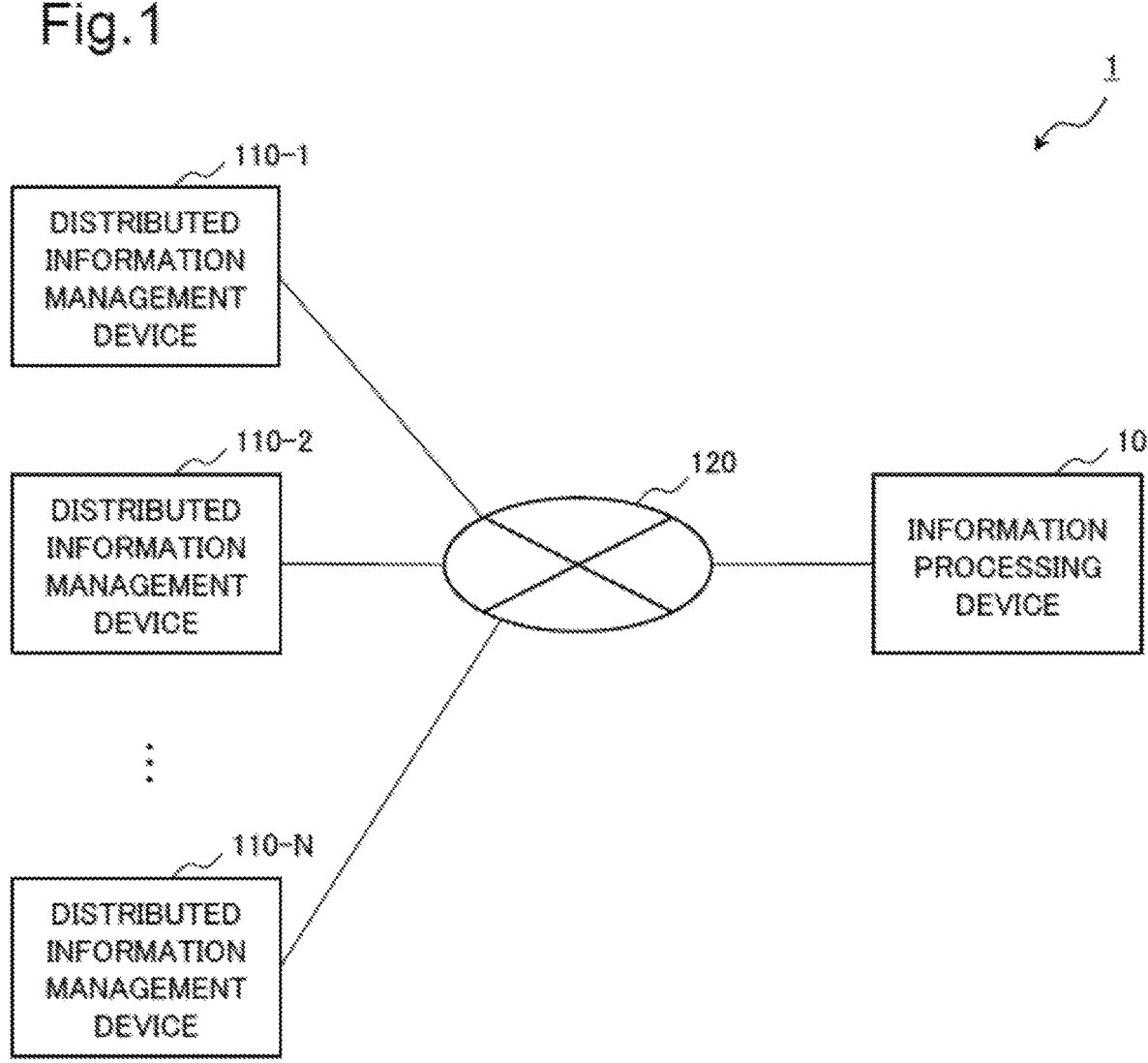
FIG. 1 is a block diagram illustrating one example of a configuration of an information processing system according to a first example embodiment of the present invention.

Example embodiments of the present invention will be described below with reference to the drawings. In the following example embodiments, technically preferable limitations are imposed to carry out the present invention, but the scope of this invention is not limited to the following description. In all drawings used to describe the following example embodiments, the same reference numerals denote similar parts unless otherwise specified. In addition, in the following example embodiments, a repetitive description of similar configurations or arrangements and operations may be omitted.

First Example Embodiment

First, an information processing system according to a first example embodiment of the present invention is described with reference to the drawings. The information processing system according to the present example embodiment has a protection function of a storage area, and includes an information processing device which protects information stored in the storage area by utilizing an encrypted file system. For example, the information processing device according to the present example embodiment is disposed near a data acquisition device of a sensor, a measuring instrument, or the like, and analyzes data acquired by the data acquisition device. The information processing device according to the present example embodiment transmits necessary data among data acquired by the data acquisition device to a data processing device configured in a server or the like disposed at a remote place.

(Configuration)

FIG. 1 is a conceptual diagram illustrating an overview of a configuration of an information processing system 1 according to the present example embodiment. The information processing system 1 includes an information processing device 10, a local network 120, and a plurality of distributed information management devices 110-1 to N (N is an integer of 2 or more).

The information processing system 1 encrypts an EFS encryption key (also referred to as a common encryption key) for encrypting and decrypting information recorded in the information processing device 10 by using a first encryption key and a second encryption key (EFS: encrypted file system). The EFS encryption key is a key for temporarily encrypting and decrypting information. The first encryption key is kept inside a secure isolated area included in the information processing device 10. The second encryption key is divided into a plurality of pieces of distributed information, and distributedly kept in the plurality of distributed information management devices 110-1 to N.

The information processing device 10 is connected to the plurality of distributed information management devices 110-1 to N via the local network 120. The information processing device 10 includes a secure isolated area. The first encryption key for constructing the EFS encryption key is kept in the secure isolated area of the information processing device 10. When receiving distributed information of the second encryption key from the plurality of distributed information management devices 110-1 to N, the information processing device 10 constructs the second encryption key by using the distributed information. When constructing the second encryption key, the information processing device 10 constructs a common encryption key by using the first encryption key and the second encryption key in the secure isolated area where trusted software operates. The information processing device 10 sets up an encrypted file system by using the constructed common encryption key in such a way as to be accessible from any software.

Each of the plurality of distributed information management devices 110-1 to N is connected to the information processing device 10 via the local network 120. Distributed information for constructing the second encryption key is stored in each of the plurality of distributed information management devices 110-1 to N. When the information processing device 10 constructs the second encryption key, the plurality of distributed information management devices 110-1 to N transmit the pieces of distributed information to the information processing device 10.

The pieces of distributed information stored in each of the plurality of distributed information management devices 110-1 to N may be different from one another, or may overlap. When there are devices storing same distributed information among the plurality of distributed information management devices 110-1 to N, the distributed information has only to be transmitted to the information processing device 10 from at least one of the distributed information management devices 110 storing the same distributed information.

The local network 120 is a network which wirelessly or wiredly connects the information processing device 10 and the plurality of distributed information management devices 110-1 to N to one another. The local network 120 is preferably configured as a dedicated line of the information processing system 1 in such a way as to be inaccessible from outside.

The above is a description regarding an overview of a configuration of the information processing system 1. Then, detailed configurations of the information processing device 10 and the plurality of distributed information management devices 110-1 to N constituting the information processing system 1 are described with reference to the drawings.

[Information Processing Device]

Figure 2:
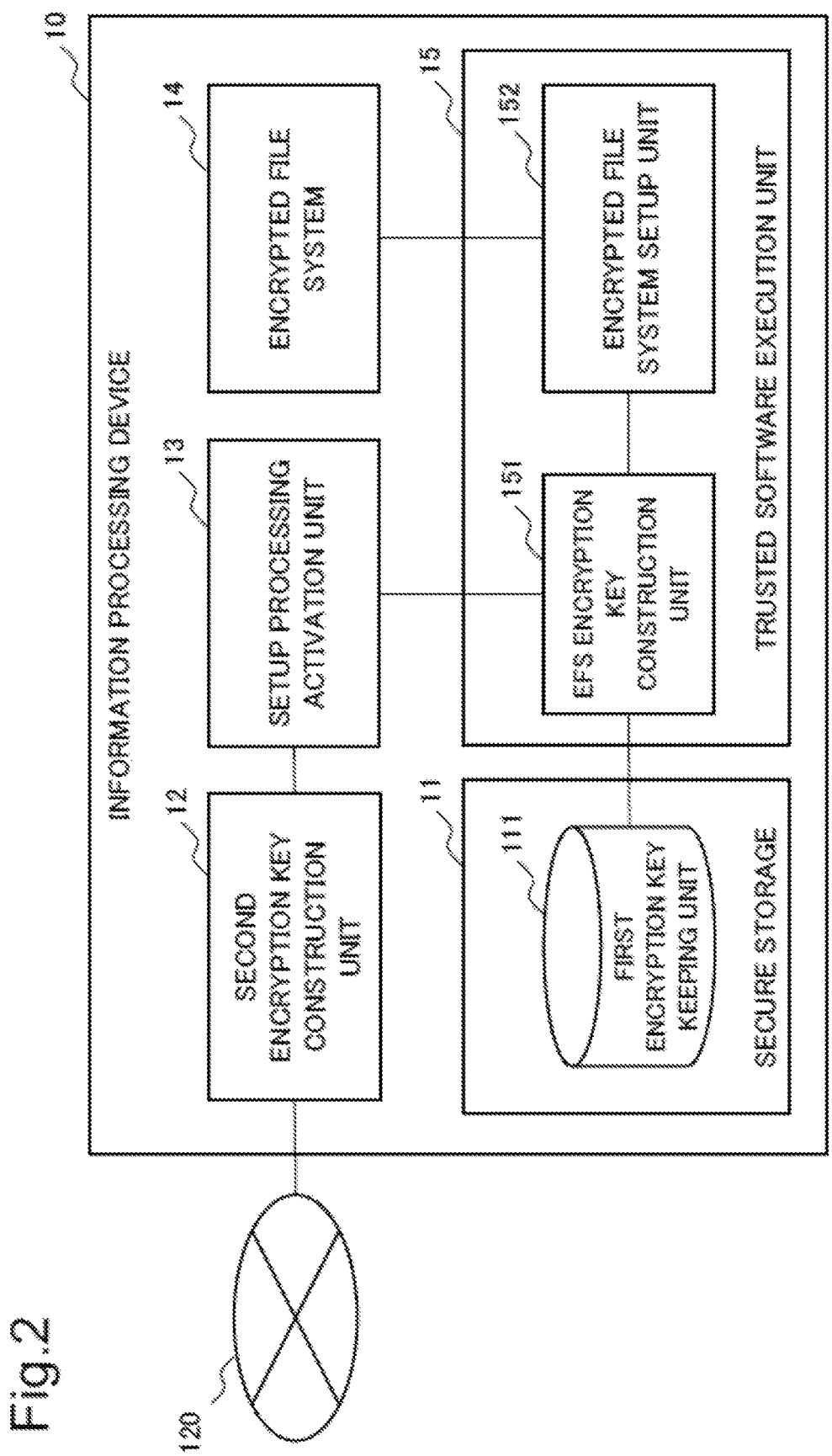
FIG. 2 is a block diagram illustrating one example of a configuration of an information processing device according to the first example embodiment of the present invention.

FIG. 2 is a block diagram illustrating one example of a configuration of an information processing device 10 according to the present example embodiment. As in FIG. 2, the information processing device 10 includes a secure storage 11, a second encryption key construction unit 12, a setup processing activation unit 13, an encrypted file system 14, and a trusted software execution unit 15. Secure isolated areas (also referred to as access limit areas) are configured inside the secure storage 11 and the trusted software execution unit 15.

The secure storage 11 is connected to the trusted software execution unit 15. A secure isolated area is configured inside the secure storage 11. The secure storage 11 is a storage accessed from the trusted software execution unit 15. In the present example embodiment, the secure storage 11 is accessible from only the trusted software execution unit 15. The secure storage 11 includes a first encryption key keeping unit 111.

Figure 3:
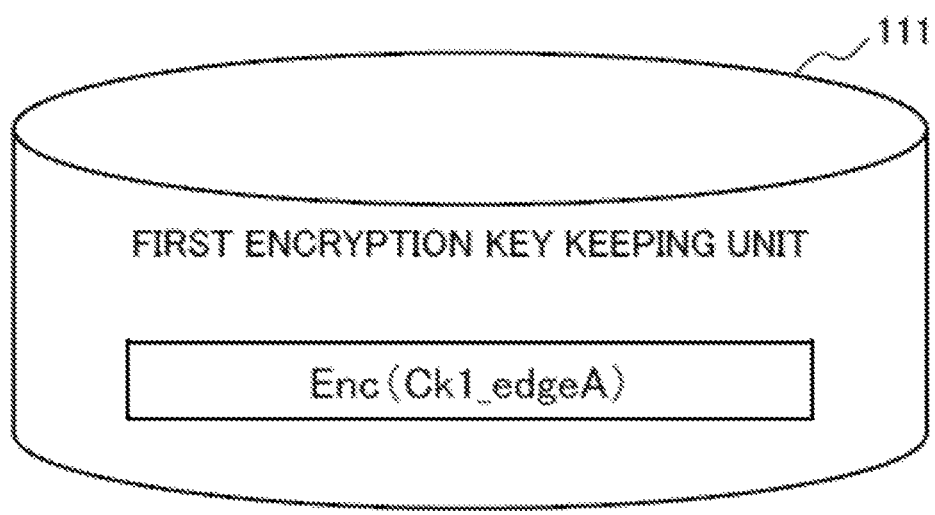
FIG. 3 is a conceptual diagram illustrating one example of a first encryption key stored in a first encryption key keeping unit of the information processing device according to the first example embodiment of the present invention.

The first encryption key keeping unit 111 (also referred to as a first encryption key keeping area) stores and keeps a first encryption key. FIG. 3 is one example (Ck1_edgeA) of the first encryption key kept by the first encryption key keeping unit 111. Note that the first encryption key in FIG. 3 is one example, and does not limit the first encryption key kept by the first encryption key keeping unit 111.

The second encryption key construction unit 12 is connected to the plurality of distributed information management devices 110-1 to N via the local network 120, and also connected to the setup processing activation unit 13. When the encrypted file system 14 is set up, the second encryption key construction unit 12 requests the plurality of distributed information management devices 110-1 to N to transmit distributed information. The second encryption key construction unit 12 receives a plurality of pieces of distributed information from the plurality of distributed information management devices 110-1 to N responding to the request. For example, when setting up the encrypted file system 14, the information processing device 10 transmits a request for distributed information to the plurality of distributed information management devices 110-1 to N, and receives distributed information transmitted in response to the request.

FIG. 4 is a diagram illustrating one example of a plurality of pieces of distributed information acquired by the second encryption key construction unit 12. Herein, Div(A, B, C) indicates C-th distributed information among B pieces distributed from information A. In the example of FIG. 4, the second encryption key construction unit 12 receives distributed information from each of the distributed information management devices 110-1 to 3.

The second encryption key construction unit 12 consolidates distributed information acquired from the plurality of distributed information management devices 110-1 to N, and constructs a second encryption key by using the plurality of pieces of consolidated distributed information. The second encryption key construction unit 12 constructs a second encryption key by using a method which pairs with a method of generating distributed information. For example, when distributed information is constructed in such a way that a second encryption key can be acquired by summing up distributed information, the second encryption key construction unit 12 constructs a second encryption key by summing up all pieces of distributed information. Moreover, for example, when distributed information is constructed by using a secret distribution technique typified by Shamir's secret sharing method, the second encryption key construction unit 12 constructs a second encryption key by using K pieces of distributed information determined by a parameter when distributed information is generated (K is a natural number). When using distributed information constructed by using a secret distribution technique, the second encryption key construction unit 12 does not need all pieces of distributed information.

A second encryption key is produced by encrypting an EFS encryption key being a key for temporarily encrypting and decrypting information by using a first encryption key. In other words, the second encryption key is an encryption key produced by making the EFS encryption key into a form unrestorable without the first encryption key.

Figures 5, 6:
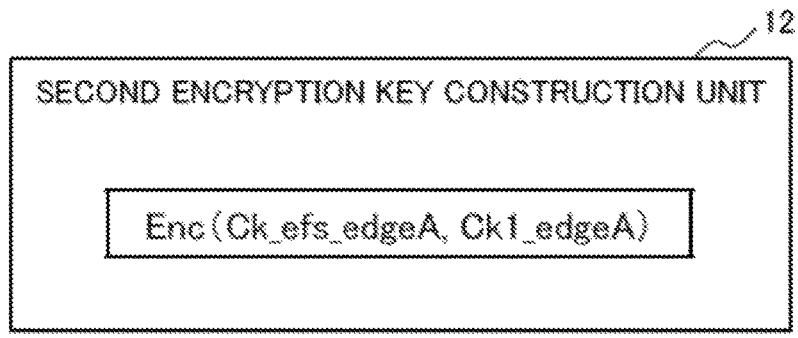
FIG. 5 is a conceptual diagram illustrating one example of a second encryption key constructed by the second encryption key construction unit of the information processing device according to the first example embodiment of the present invention.
FIG. 6 is a conceptual diagram illustrating one example of encrypted information stored in an encrypted file system of the information processing device according to the first example embodiment of the present invention.

FIG. 5 is one example (Enc (Ck_efs_edgeA, Ck1_edgeA)) of the second encryption key constructed by the second encryption key construction unit 12. The second encryption key Enc (Ck_efs_edgeA, Ck1_edgeA) in FIG. 5 is encrypted information relating to an EFS encryption key Ck_efs_edgeA encrypted by using a first encryption key Ck1_edgeA. Note that the second encryption key in FIG. 5 is one example, and does not limit the second encryption key constructed by the second encryption key construction unit 12.

The setup processing activation unit 13 is inserted in an activation sequence of a device, and is invoked when the device is activated. When a device is activated, the setup processing activation unit 13 causes the second encryption key construction unit 12 to construct a second encryption key. The setup processing activation unit 13 outputs the second encryption key constructed by the second encryption key construction unit 12 to the trusted software execution unit 15, and causes the trusted software execution unit 15 to start setup processing of the encrypted file system 14. For example, the setup processing activation unit 13 is registered in a boot sequence in Linux (registered trademark).

The encrypted file system 14 encrypts and then stores information (data) in a predetermined unit. For example, the encrypted file system 14 encrypts and then stores information in a file unit, a segment unit, a unit combining a plurality of files, or the like. The encrypted file system 14 holds the EFS encryption key Ck_efs_edgeA in a computer memory connected to a device. When access processing including reading and writing of information from any software is performed, the encrypted file system 14 encrypts and decrypts information by using the EFS encryption key Ck_efs_edgeA.

FIG. 6 is one example of encrypted information stored in the encrypted file system 14. In the example of FIG. 6, the encrypted file system 14 stores encrypted information in a file unit by using the EFS encryption key Ck_efs_edgeA. In FIG. 6, Enc (A, B) represents encrypted information regarding original data A encrypted by using a common encryption key B (EFS encryption key).

The trusted software execution unit 15 (also referred to as a software execution unit) constructs an EFS encryption key Ck_efs_edgeA by using the first encryption key Ck1_edgeA and the second encryption key Enc (Ck_efs_edgeA, Ck1_edgeA). The trusted software execution unit 15 outputs the constructed EFS encryption key Ck_efs_edgeA to the encrypted file system 14. The trusted software execution unit 15 sets up the encrypted file system 14 in such a way as to be accessible from any software. The trusted software execution unit 15 assures that software operating inside is not tampered with and trusted software.

The trusted software execution unit 15 includes an EFS encryption key construction unit 151 and an encrypted file system setup unit 152. For example, the EFS encryption key construction unit 151 and the encrypted file system setup unit 152 are configured as software operating in the trusted software execution unit 15. In this case, the trusted software execution unit 15 assures that software (the EFS encryption key construction unit 151 and the encrypted file system setup unit 152) operating inside is not tampered with and trusted software.

The EFS encryption key construction unit 151 (also referred to as a common encryption key construction unit) verifies whether the read setup processing activation unit 13 is a valid process. When determining that the setup processing activation unit 13 is a valid process, the EFS encryption key construction unit 151 reads the first encryption key Ck1_edgeA from the first encryption key keeping unit 111 in the secure storage 11. The EFS encryption key construction unit 151 constructs an EFS encryption key Ck_efs_edgeA by using the first encryption key Ck1_edgeA and the second encryption key Enc (Ck_efs_edgeA, Ck1_edgeA). The EFS encryption key construction unit 151 outputs the constructed EFS encryption key Ck_efs_edgeA to the encrypted file system setup unit 152.

The encrypted file system setup unit 152 (also referred to as a setup unit) acquires the EFS encryption key Ck_efs_edgeA from the EFS encryption key construction unit 151. The encrypted file system setup unit 152 outputs the EFS encryption key Ck_efs_edgeA to the encrypted file system 14. The encrypted file system setup unit 152 sets up the encrypted file system 14 in such a way that information can be read and written from any software.

The above is a description regarding the configuration of the information processing device 10 according to the present example embodiment. Note that the configuration illustrated in each of FIGS. 2 to 3 is one example, and does not limit the configuration of the information processing device 10 to an unchanged form.

[Distributed Information Management Device]

Figures 7, 8:
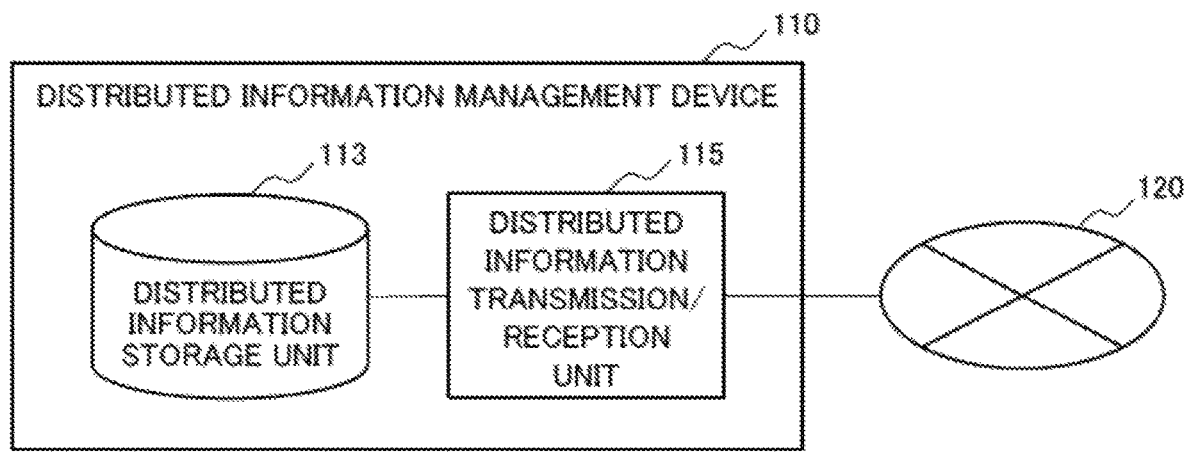
FIG. 7 is a block diagram illustrating one example of a configuration of a distributed information management device according to the first example embodiment of the present invention.
FIG. 8 is a conceptual diagram illustrating another example of distributed information stored in the distributed information management device according to the first example embodiment of the present invention.

FIG. 7 is a block diagram illustrating one example of a configuration of the distributed information management device 110. As in FIG. 7, the distributed information management device 110 includes a distributed information storage unit 113 and a distributed information transmission/reception unit 115.

The distributed information storage unit 113 is connected to the distributed information transmission/reception unit 115. One of a plurality of pieces of distributed information for constructing a second encryption key is stored in the distributed information storage unit 113. The distributed information storage unit 113 is accessible from the distributed information transmission/reception unit 115.

The distributed information transmission/reception unit 115 is connected to the distributed information storage unit 113. The distributed information transmission/reception unit 115 is also connected to the information processing device 10 via the local network 120. When receiving a request for distributed information from the information processing device 10, the distributed information transmission/reception unit 115 acquires distributed information from the distributed information storage unit 113 in response to the request. The distributed information transmission/reception unit 115 transmits distributed information responding to the request to the information processing device 10.

For example, it is assumed that a second encryption key of the information processing device 10 to which an identifier called an edge A is given can be restored by using three pieces of distributed information among five pieces of distributed information. In this instance, among the distributed information management devices 110-1 to N receiving a request for distributed information, the distributed information management device 110 storing distributed information for restoring a second encryption key transmits distributed information stored in a local device to the edge A (information processing device 10).

FIG. 8 is one example of distributed information stored in the distributed information storage unit 113 of any one of the distributed information management devices 110. FIG. 8 is an example in which distributed information of an EFS encryption key encrypted by a first encryption key is stored in the distributed information storage unit 113 in relation to each of a plurality of information processing devices 10 to which edge identifiers called an edge A, an edge C, an edge D, and an edge E are given. In FIG. 8, Sep(A, B, C, D) indicates D-th distributed information when information A is distributed into B pieces of distributed information by a secret distribution technique, and the information A can be restored by using C pieces of distributed information among the B pieces of distributed information.

In FIG. 8, encrypted information called Sep(Enc(Ck_efs_edgeA, Ck1_edgeA), 5, 3, 1) is stored in the distributed information storage unit 113 in relation to the edge A. The encrypted information called Sep(Enc(Ck_efs_edgeA, Ck1_edgeA), 5, 3, 1) indicates first distributed information of three pieces of distributed information needed to restore an EFS encryption key of the edge A, among pieces of distributed information of the EFS encryption key of the edge A distributed into 5 pieces.

The above is a description regarding the configuration of the distributed information management device 110. Note that the configuration illustrated in FIGS. 7 and 8 is one example, and does not limit the configuration of the distributed information management device 110 to an unchanged form.

(Operation)

Figure 9:
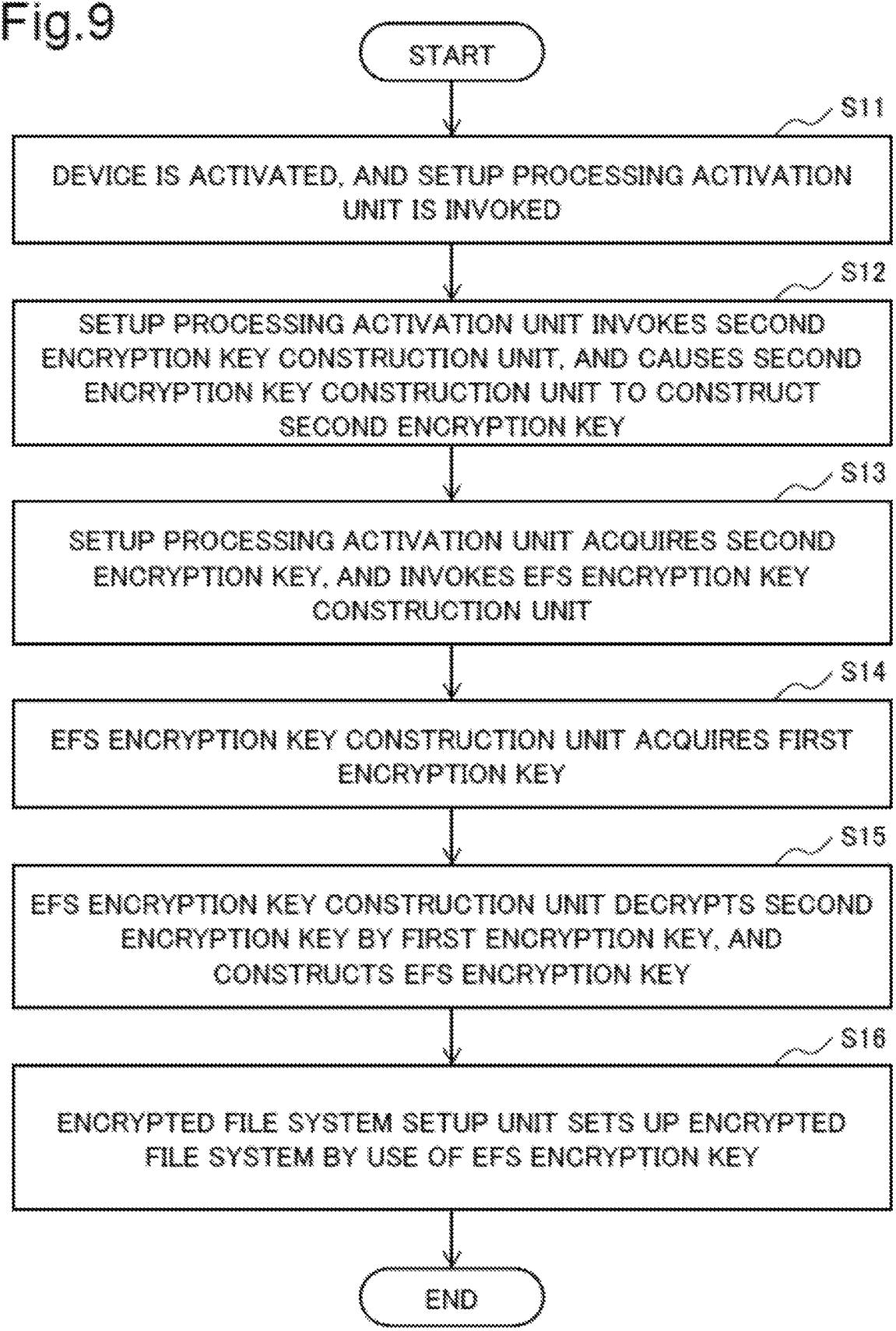
FIG. 9 is a flowchart for describing an overview of an operation of the information processing device according to the first example embodiment of the present invention.

Next, an overview of an operation of the information processing device 10 according to the present example embodiment is described with reference to the drawing. FIG. 9 is a flowchart for describing an overview of an operation of the information processing device 10. Note that a component (FIG. 2) of the information processing device 10 is described as a major part of an operation in the description along the flowchart in FIG. 9 below, but it is also possible to regard the information processing device 10 as a major part of an operation.

In FIG. 9, first, when the information processing device 10 is activated, the setup processing activation unit 13 is invoked (step S11).

Next, the setup processing activation unit 13 invokes the second encryption key construction unit 12, and causes the second encryption key construction unit 12 to construct a second encryption key Enc (step S12).

Next, the setup processing activation unit 13 acquires a second encryption key from the second encryption key construction unit 12. The setup processing activation unit 13 outputs the acquired second encryption key to the EFS encryption key construction unit 151, and invokes the EFS encryption key construction unit 151 (step S13).

Next, the EFS encryption key construction unit 151 of the trusted software execution unit 15 acquires a first encryption key from the first encryption key keeping unit 111 (step S14).

Next, the EFS encryption key construction unit 151 constructs an EFS encryption key by using the first encryption key and the input second encryption key (step S15). The EFS encryption key construction unit 151 outputs the constructed EFS encryption key to the encrypted file system setup unit 152.

Then, the encrypted file system setup unit 152 executes setup of the encrypted file system 14 by using the EFS encryption key (step S16).

An encrypted file system is mounted on a path called "/secure" by the procedure described above, and accordingly, encryption and decryption using an EFS encryption key are executed in a file unit when software accesses the "/secure". When information is held in the encrypted file system 14 as in FIG. 4, it becomes possible to correctly read a file by decrypting an encrypted file by using an EFS encryption key.

The above is a description regarding the overview of the operation of the information processing device 10 according to the present example embodiment. Note that the processing along the flowchart in FIG. 9 is one example, and does not limit the operation of the information processing device 10 to an unchanged form.

[Second Encryption Key Generation Processing]

Figure 10:
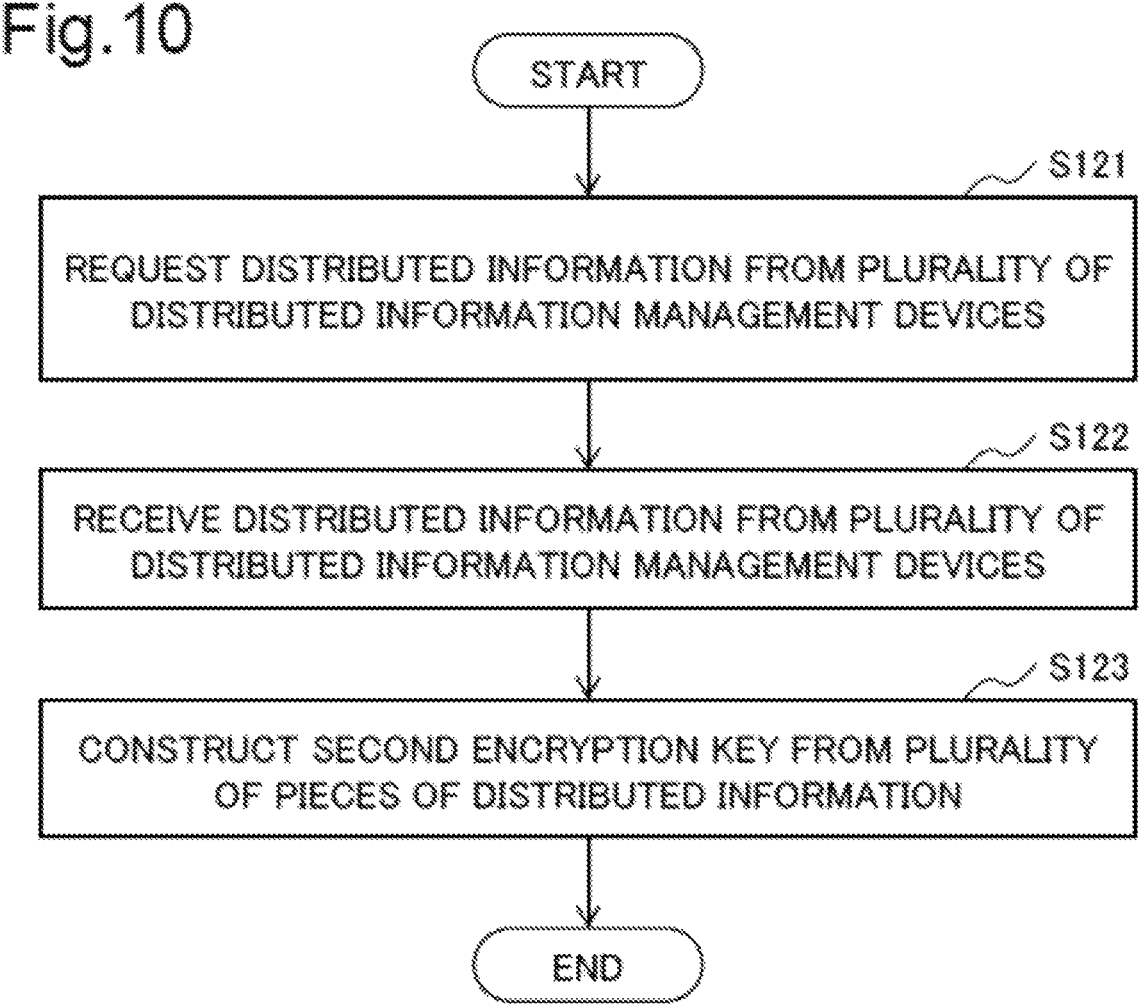
FIG. 10 is a flowchart for describing an operation in which the second encryption key construction unit of the information processing device according to the first example embodiment of the present invention constructs a second encryption key.

Next, one example of an operation in which the second encryption key construction unit 12 constructs a second encryption key in the step S12 of the flowchart in FIG. 9 is described by using a flowchart in FIG. 10 and distributed information illustrated in FIG. 8.

In FIG. 10, first, the second encryption key construction unit 12 requests distributed information from the plurality of distributed information management devices 110-1 to N (step S121).

Next, the second encryption key construction unit 12 receives a plurality of pieces of distributed information transmitted from the plurality of distributed information management devices 110-1 to N in response to the request (step S122). In this instance, as illustrated in FIG. 4, the plurality of pieces of distributed information are consolidated in the second encryption key construction unit 12.

Finally, the second encryption key construction unit 12 constructs a second encryption key from the plurality of pieces of collected distributed information (step S123).

The above is a description regarding an overview of an operation of the second encryption key construction unit 12 of the information processing device 10 according to the present example embodiment. Note that the processing along the flowchart in FIG. 10 is one example, and does not limit the operation of the second encryption key construction unit 12 to an unchanged procedure.

As above, the information processing device according to the present example embodiment is provided with a secure storage including a first encryption key keeping unit, a second encryption key construction unit, an encrypted file system, a setup processing activation unit, and a software execution unit. The secure storage includes an access limit area accessible by only trusted software executed by a local device, and the first encryption key keeping unit which keeps a first encryption key is constructed inside the access limit area. The second encryption key construction unit consolidates a plurality of pieces of distributed information via a local network from a plurality of distributed information management devices distributedly storing the plurality of pieces of distributed information for constructing a second encryption key being a common encryption key encrypted by a first encryption key. The second encryption key construction unit constructs a second encryption key by using the plurality of pieces of consolidated distributed information. The encrypted file system includes an encrypted area recording processing target data encrypted by a common encryption key. For example, the encrypted file system records processing target data encrypted for each file by the common encryption key. The setup processing activation unit causes the second encryption key construction unit to construct the second encryption key in response to activation of the information processing device according to the present example embodiment, acquires the second encryption key constructed by the second encryption key construction unit, and outputs the acquired second encryption key. The software execution unit is executed as the trusted software, acquires the second encryption key from the setup processing activation unit, and verifies whether the setup processing activation unit being a transmission source of the second encryption key is a valid process. When the setup processing activation unit is a valid process, the software execution unit acquires the first encryption key from the first encryption key keeping unit, and constructs the common encryption key by using the first encryption key and the second encryption key. The software execution unit sets up an encrypted file system by using the constructed common encryption key in such a way as to be accessible from any software.

The software execution unit includes a common encryption key construction unit and a setup unit. The common encryption key construction unit is connected to the setup processing activation unit and the first encryption key keeping unit. The common encryption key construction unit acquires a second encryption key from the setup processing activation unit, acquires a first encryption key from the first encryption key keeping unit in line with acquisition of the second encryption key. And then, the common encryption key construction unit constructs a common encryption key by using the acquired first encryption key and the second encryption key. The setup unit is connected to the common encryption key construction unit and the encrypted file system. The setup unit acquires a common encryption key from the common encryption key construction unit, and sets up, by using the acquired common encryption key, an encrypted file system in such a way as to be accessible from any software.

An operation of the information processing device according to the present example embodiment can also be expressed as follows. When the information processing device according to the present example embodiment is activated, the setup processing activation unit causes the second encryption key construction unit to construct a second encryption key, transfers the second encryption key to the common encryption key construction unit, and then invokes the common encryption key construction unit. The common encryption key construction unit verifies whether the read setup processing activation unit is a valid process. When determining that the setup processing activation unit is a valid process, the common encryption key construction unit reads a first encryption key from the first encryption key keeping unit of the secure storage, and constructs a common encryption key by using the first encryption key and the second encryption key. The common encryption key construction unit transfers the constructed common encryption key to an encrypted file system setup unit, and then invokes the encrypted file system setup unit. The encrypted file system setup unit transfers the common encryption key to the encrypted file system, and then sets up the encrypted file system in such a way as to be accessible from any software.

The information processing device according to the present example embodiment sets up the encrypted file system into an accessible state by using trusted software in an isolated area and an encryption key. Thus, an information processing device according to the present example embodiment can accomplish, by the information processing device alone, both protection of information and continuous running of an Internet of things (IoT) system.

The information processing device according to the present example embodiment is set up in such a way as to be able to autonomously access information stored in an encrypted file system from any software when the device is activated. Thus, the information processing device according to the present example embodiment enables any software to take advantage of information stored in an encrypted file system.

Furthermore, with the information processing device according to the present example embodiment, encrypted information stored in the encrypted file system, and information protected by the secure storage can only be acquired even when the present device is stolen. Thus, a common encryption key for decrypting encrypted information is not constructed, and therefore, encrypted information stored in the encrypted file system is protected.

As above, the present example embodiment is able to reduce a leakage risk of information encrypted and then stored in an encrypted file system, even when the information processing device is stolen. Moreover, according to the present example embodiment, a system halt resulting from protection of information is able to be eliminated even when a network is interrupted, or when a manager is absent. In other words, the present example embodiment enables both information protection and continuous running in an IoT system.

Furthermore, according to the present example embodiment, a configuration is provided in such a way that distributed information for constructing a second encryption key is distributedly arranged in a plurality of distributed information management devices. Therefore, it becomes possible to easily utilize a plurality of encrypted file systems, without accessing a secure isolated area.

In other words, the present example embodiment is able to provide an information processing device which accomplishes both autonomous reactivation of an edge and encryption of information, and enables secure and continuous running of an IoT system, without being stably connected to a network.

Second Example Embodiment

Next, an information processing device according to a second example embodiment of the present invention is described with reference to the drawings. The information processing device according to the present example embodiment is different from the information processing device according to the first example embodiment in that a trusted operating system (OS) verifies a software signature.

Figure 11:
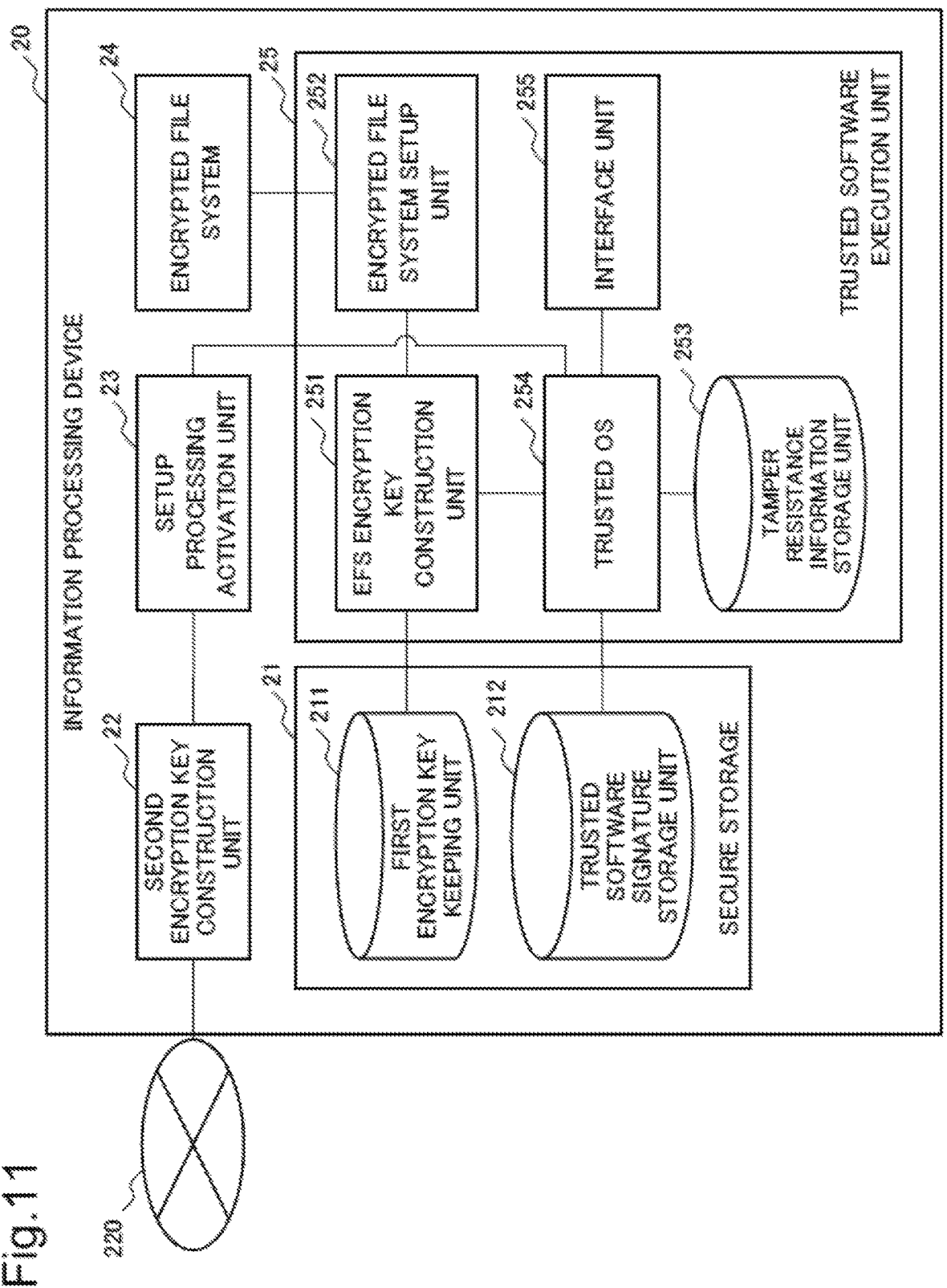
FIG. 11 is a block diagram illustrating one example of a configuration of an information processing device according to a second example embodiment of the present invention.

FIG. 11 is a block diagram illustrating one example of a configuration of an information processing device 20 according to the present example embodiment. As in FIG. 11, the information processing device 20 includes a secure storage 21, a second encryption key construction unit 22, a setup processing activation unit 23, an encrypted file system 24, and a trusted software execution unit 25. Secure isolated areas are configured inside the secure storage 21 and the trusted software execution unit 25. The second encryption key construction unit 22 is connected to a plurality of distributed information management devices (not illustrated) via a local network 220.

The information processing device 20 (FIG. 11) according to the present example embodiment is different from the information processing device 10 (FIG. 2) according to the first example embodiment in configurations of the secure storage 21 and the trusted software execution unit 25. Components other than the secure storage 21 and the trusted software execution unit 25 in the information processing device 20 (FIG. 11) are similar to those in the information processing device 10 (FIG. 2) except for some functions. Thus, a difference from the information processing device 10 (FIG. 2) is described below.

As in FIG. 11, the secure storage 21 includes a trusted software signature storage unit 212 in addition to a first encryption key keeping unit 211. The secure storage 21 is encrypted with a fourth encryption key which is an encryption key being configured under a predetermined rule by a third encryption key described later, and serving to encrypt and decrypt data encrypted inside the secure storage. In other words, the first encryption key keeping unit 211 and the software signature storage unit 212 are also encrypted by the fourth encryption key.

Figure 12:
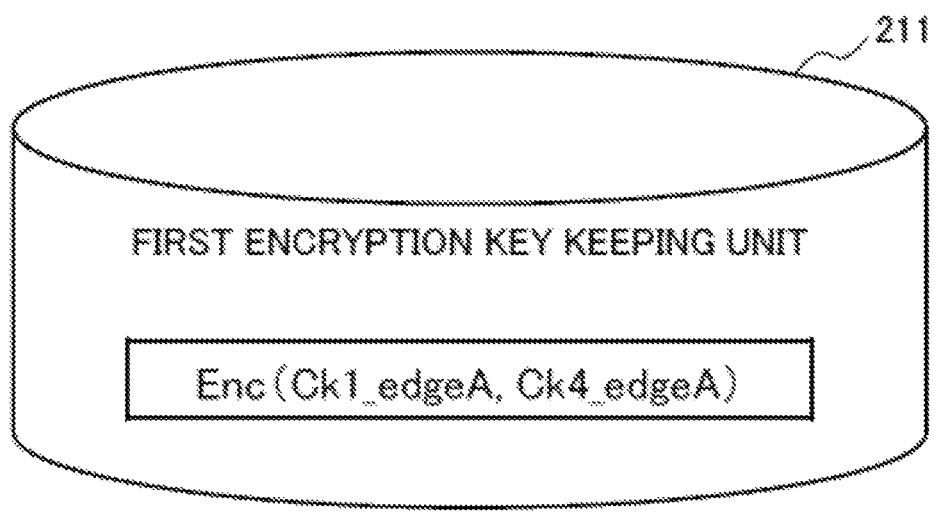
FIG. 12 is a diagram illustrating one example of encrypted information stored in a first encryption key keeping unit of the information processing device according to the second example embodiment of the present invention.

The first encryption key keeping unit 211 keeps encrypted information relating to a first encryption key encrypted by using the fourth encryption key. FIG. 12 is one example of encrypted information Enc(Ck1_edgeA, Ck4_edgeA) kept by the first encryption key keeping unit 211. The encrypted information Enc(Ck1_edgeA, Ck4_edgeA) is encrypted information relating to a first encryption key (Ck1_edgeA) encrypted by using a fourth encryption key (Ck4_edgeA). Note that encrypted information in FIG. 12 is one example, and does not limit encrypted information kept by the first encryption key keeping unit 211.

A trusted software signature (also referred to as signature information) being an electronic signature for trusted software is stored in the trusted software signature storage unit 212 (also referred to as a signature information storage area). The trusted software signature stored in the trusted software signature storage unit 212 is also encrypted by a fourth encryption key.

FIG. 13 is one example of signature information stored in the trusted software signature storage unit 212. In FIG. 13, Sig(A, B) represents a signature generated by using a signature key B for A. Signature information is stored in the trusted software signature storage unit 212 for each piece of trusted software. In the example of FIG. 13, signature information generated by using a signature key Pk_sig_edgeA for trusted software for which a hash value is taken is stored in the trusted software signature storage unit 212. The signature key Pk_sig_edgeA is a key for signature of a key pair (Pk_sig_edgeA, Pk_var_edgeA) of public key encryption generated with a third encryption key K3_edgeA as a seed.

Furthermore, as in FIG. 11, the trusted software execution unit 25 includes a tamper resistance information storage unit 253, a trusted OS 254, and an interface unit 255, in addition to an EFS encryption key construction unit 251, and an encrypted file system setup unit 252.

The tamper resistance information storage unit 253 (also referred to as a tamper resistance information storage area) stores a verification key of a trusted software signature, and a third encryption key serving as a generation source of an encryption key necessary for decryption of information stored in the secure storage 21. The tamper resistance information storage unit 253 has high tamper resistance, and assures that overwriting and reading are not enabled from outside of the trusted software execution unit 25.

The trusted OS 254 verifies trusted software by using the trusted software signature and the third encryption key. The trusted OS 254 operates only trusted software determined to be valid, and enables reading and writing of the trusted software and the secure storage 21.

The interface unit 255 provides a function of communication between software and the trusted software. The interface unit 255 enables communication between any software in a normal software area, and the trusted software.

Note that the trusted software execution unit 25 is not limited to the configuration in FIG. 11, and has only to have two features below. A first feature is a feature of being able to verify trusted software operating inside the trusted software execution unit 25, and being able to access the trusted software from a normal software area only through a specific interface. A second feature is a feature of being able to invoke information stored in the secure storage 21 from internal trusted software. As a trusted software execution unit 25 having these features, ARM (registered trademark) TrustZone (registered trademark), Intel (registered trademark) Software Gard eXtensions (Intel SGX), or the like provided an extended function of a processor is conceivable. However, a trusted software execution unit 25 having the above-described features is not limited to the above-described trusted software execution unit.

The above is a description regarding the configuration of the information processing device 20 according to the present example embodiment. Note that the configuration illustrated in each of FIGS. 11 to 13 is one example, and does not limit the configuration of the information processing device 20 to an unchanged form. Additionally, a connection relation among components illustrated in FIG. 11 is one example, and does not limit a connection relation among components.

(Operation)

Figure 14:
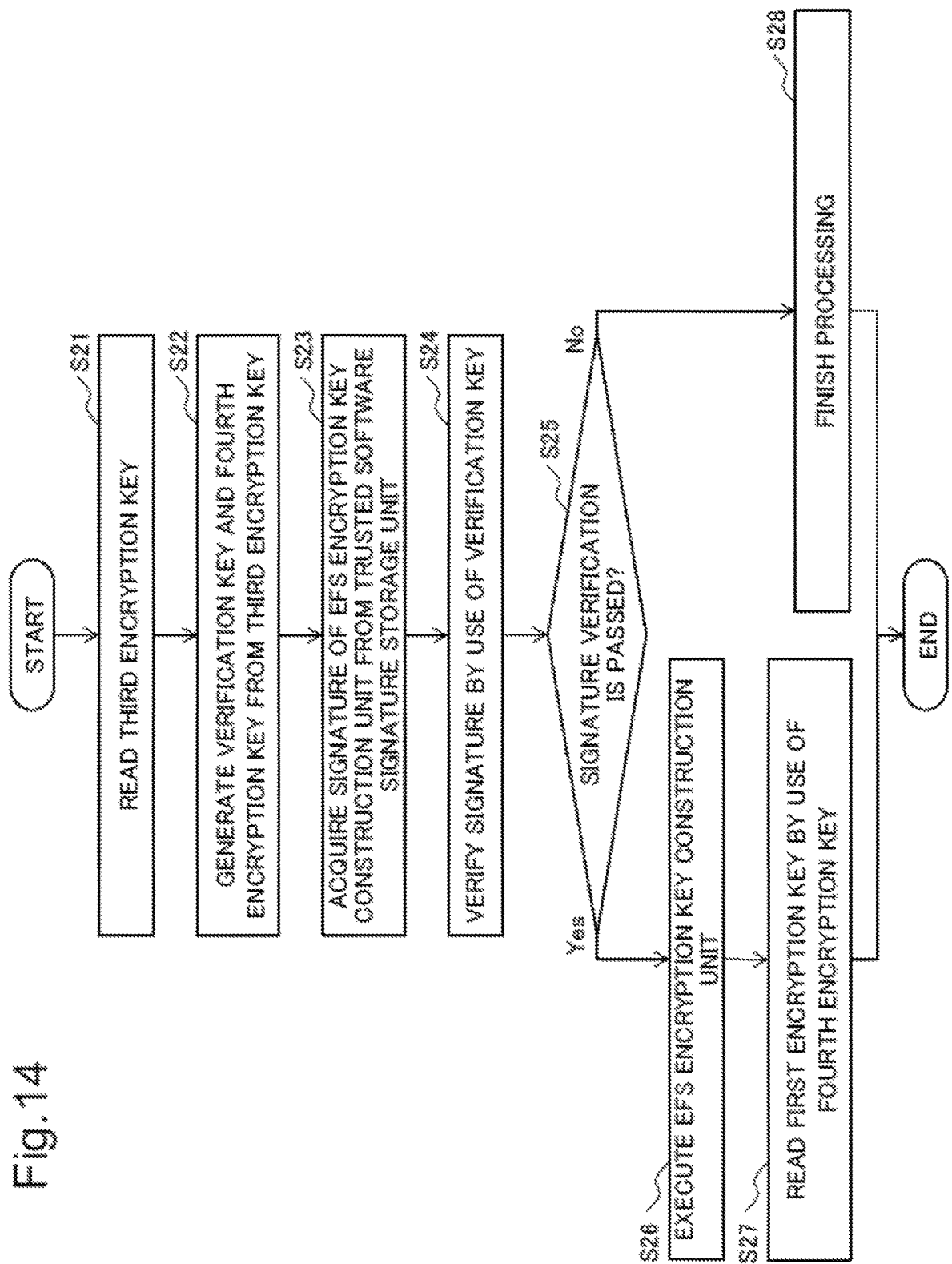
FIG. 14 is a flowchart for describing an operation of the information processing device according to the second example embodiment of the present invention.

Next, an operation of the information processing device according to the present example embodiment is described with reference to the drawing. FIG. 14 is a flowchart for describing an operation of the trusted software execution unit 25 of the information processing device according to the present example embodiment. Processing along the flowchart in FIG. 14 relates to processing in the step S14 of the flowchart in FIG. 9. More specifically, processing along the flowchart in FIG. 14 relates to an operation in which the trusted software execution unit 25 verifies the EFS encryption key construction unit 251 being trusted software, and the EFS encryption key construction unit 251 reads a first encryption key from the first encryption key keeping unit 211.

In FIG. 14, first, the trusted OS 254 reads a third encryption key K3_edgeA from the tamper resistance information storage unit 253 (step S21).

Next, the trusted OS 254 generates a key pair (Pk_sig_edgeA, Pk_var_edgeA) and a fourth encryption key Ck4_edgeA, with the third encryption key K3_edgeA as a seed (step S22).

Next, the trusted OS 254 acquires a signature Sig (Hash (EFS encryption key construction unit), Pk_sig_edgeA) of the EFS encryption key construction unit 251 from the trusted software signature storage unit 212 in the secure storage 21 (step S23).

Next, the trusted OS 254 calculates a hash value Hash (EFS encryption key construction unit) of the EFS encryption key construction unit 151. The trusted OS 254 verifies the acquired signature Sig (Hash (EFS encryption key construction unit), Pk_sig_edgeA) by using the hash value and a verification key Pk_var_edgeA (step S24). In this instance, as long as the EFS encryption key construction unit 151 is not tampered with, signature verification is passed.

Herein, the trusted software execution unit 25 determines whether signature verification is passed (step S25). When signature verification is passed in the step S25 (Yes in step S25), the trusted software execution unit 25 executes processing of the EFS encryption key construction unit 251 (step S26).

Then, the EFS encryption key construction unit 251 decrypts encrypted information Enc (Ck1_edgeA, Ck4_edgeA) stored in the first encryption key keeping unit 211, by using the fourth encryption key Ck4_edgeA generated by the trusted OS 254 (step S27).

On the other hand, when signature verification is not passed in the step S25 (No in step S25), processing is finished (step S28).

The above is a description relating to the operation in which the trusted software execution unit 25 verifies the EFS encryption key construction unit 251 being trusted software, and the EFS encryption key construction unit 251 reads a first encryption key from the first encryption key keeping unit 211. The EFS encryption key construction unit 251 constructs an EFS encryption key by using a first encryption key read by the procedure along the flowchart in FIG. 14, and a second encryption key. This processing is equivalent to processing in the step S15 of the flowchart in FIG. 9. Note that the processing along the flowchart in FIG. 14 is one example, and does not limit the operation of the trusted software execution unit 25 to an unchanged procedure.

As above, signature information for trusted software is stored, in addition to a first encryption key keeping unit, inside an access limit area of a secure storage of the information processing device according to the present example embodiment. The signature information for trusted software is generated by using a signature key generated under a predetermined rule, based on a third encryption key. The secure storage is encrypted by a fourth encryption key being configured under a predetermined rule by a third encryption key, and serving to encrypt and decrypt data encrypted inside the secure storage. A software execution unit includes a trusted operating system, a tamper resistance information storage unit, and an interface unit. The trusted operating system is able to access the signature information storage unit. The tamper resistance information storage unit is limited in overwriting and reading from outside of the software execution unit, and stores a third encryption key. The interface unit provides a function of communication between trusted software included in the software execution unit and any software.

The software execution unit acquires a second encryption key from a setup processing activation unit, and acquires a third encryption key from the tamper resistance information storage unit in line with acquisition of the second encryption key. The software execution unit decrypts encrypted signature information stored in the signature information storage unit by using the acquired third encryption key. The software execution unit verifies reliability of internal software of the software execution unit by using the decrypted signature information, and operates trusted software, based on a verification result.

In the information processing device according to the present example embodiment, a trusted software execution unit confirms whether an EFS encryption key construction unit being trusted software is tampered with. Then, the trusted software execution unit constructs an EFS encryption key by using a first encryption key and a second encryption key at activation of the device, by an EFS encryption key construction unit being trusted software determined not to be tampered with. In the information processing device according to the present example embodiment, an encrypted file system is set up by using the EFS encryption key. Thus, the information processing device according to the present example embodiment can set up an encrypted file system by the information processing device alone. As a result, in the information processing device according to the present example embodiment, important information is constantly encrypted on a storage area, and software that needs to access information is brought into a state of being able to appropriately access even when the information processing device alone is activated.

In other words, by incorporating the information processing device according to the present example embodiment into an IoT system as an edge, it is possible to achieve an IoT system which protects important information by encryption, and yet continuously runs even when a network is interrupted and a manager is absent.

In an encrypted file system included in the information processing device according to the present example embodiment, an EFS encryption key needs to be held in a volatile storage area or the like inside the system. Basically, a file system is executed in a privileged mode of an operating system. Thus, an EFS encryption key held in the encrypted file system is not accessible from a process generated by a normal user.

Third Example Embodiment

Next, an information processing device according to a third example embodiment of the present invention is described with reference to the drawings. The information processing device according to the present example embodiment is different from the information processing device according to the first example embodiment in managing distributed information on the basis of circulation information relating to a circulation condition of distributed information.

Figure 15:
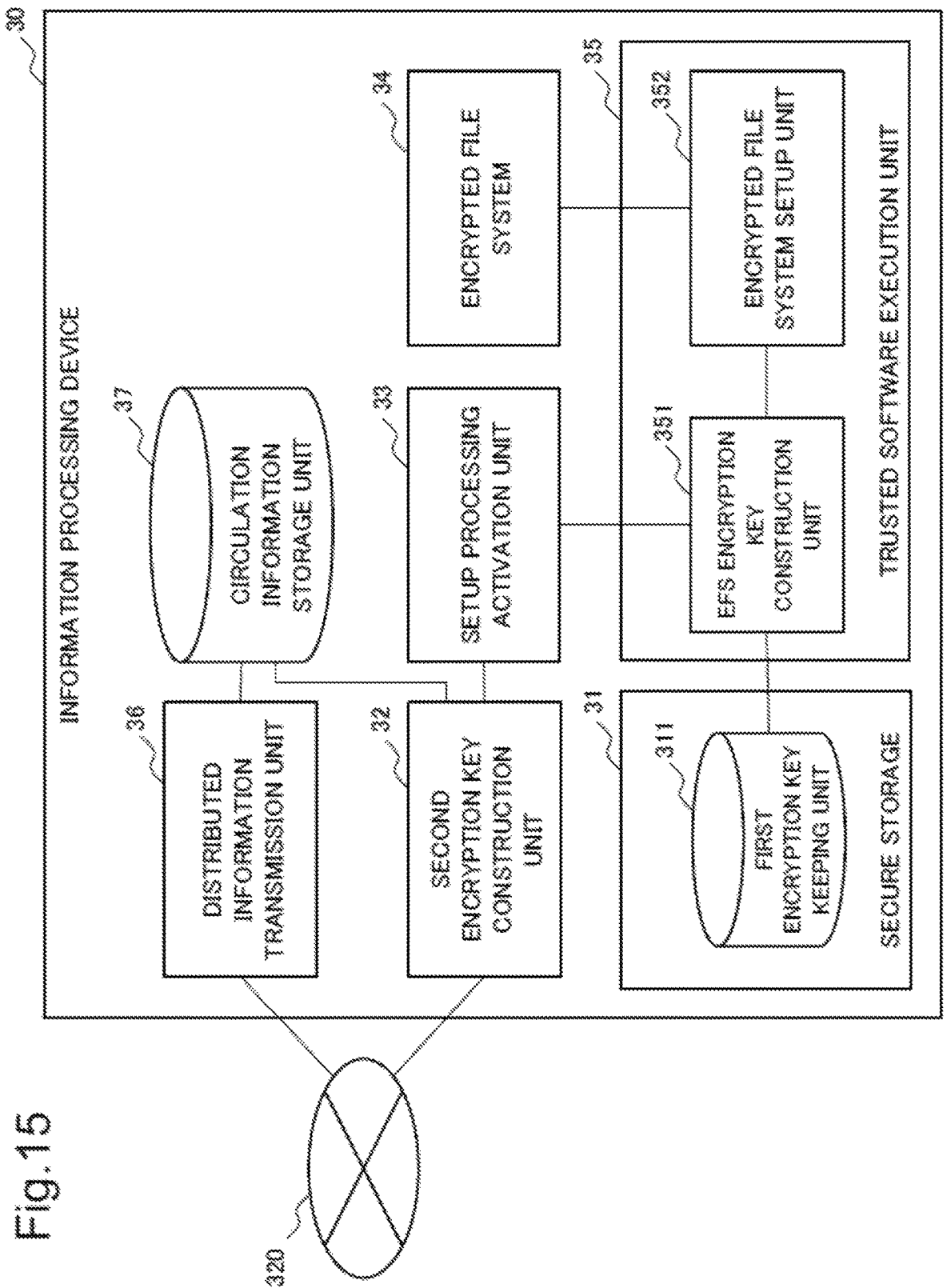
FIG. 15 is a block diagram illustrating one example of a configuration of an information processing device according to a third example embodiment of the present invention.

FIG. 15 is a block diagram illustrating one example of a configuration of an information processing device 30 according to the present example embodiment. As in FIG. 15, the information processing device 30 includes a distributed information transmission unit 36 and a circulation information storage unit 37, in addition to a secure storage 31, a second encryption key construction unit 32, a setup processing activation unit 33, an encrypted file system 34, and a trusted software execution unit 35. Secure isolated areas are configured inside the secure storage 31 and the trusted software execution unit 35. The secure storage 31 includes a first encryption key keeping unit 311. The trusted software execution unit 35 includes an EFS encryption key construction unit 351 and an encrypted file system setup unit 352. The second encryption key construction unit 32 and the distributed information transmission unit 36 are connected to a plurality of distributed information management devices (not illustrated) via a local network 320.

The information processing device 30 (FIG. 15) according to the present example embodiment is different from the information processing device 10 (FIG. 2) according to the first example embodiment in including the distributed information transmission unit 36 and the circulation information storage unit 37. Components other than the distributed information transmission unit 36 and the circulation information storage unit 37 in the information processing device 20 (FIG. 15) are similar to those in the information processing device 10 (FIG. 2) except for some functions. Thus, a difference from the information processing device 10 (FIG. 2) is described below.

The distributed information transmission unit 36 transmits distributed information of a second encryption key to a distributed information management device (not illustrated). The distributed information transmission unit 36 stores identification information of distributed information, and identification information of a distributed information management device being a transmission destination of distributed information, in the circulation information storage unit 37 as circulation information. For example, the distributed information transmission unit 36 stores K-th distributed information among pieces of distributed information produced by distributing a second encryption key into N pieces, in the circulation information storage unit 37 as such circulation information as (N,K) (N is a natural number, and K is a natural number of N or less).

The circulation information including the identification information of distributed information transmitted by the distributed information transmission unit 36, and the identification information of the distributed information management device being the transmission destination is stored in the circulation information storage unit 37. For example, a host name and an Internet Protocol (IP) address on the local network 320 are stored in the circulation information storage unit 37 as identification information of a distributed information management device being a transmission destination.

(Operation)

Next, an operation in which the information processing device 30 manages distributed information is described with reference to the drawings. An operation (circulation information management method) of managing circulation information of distributed information transmitted to a distributed information management device, and an operation (distributed information consolidation method) of consolidating distributed information distributed to a distributed information management device are described below.

[Circulation Information Management Method]

Figure 16:
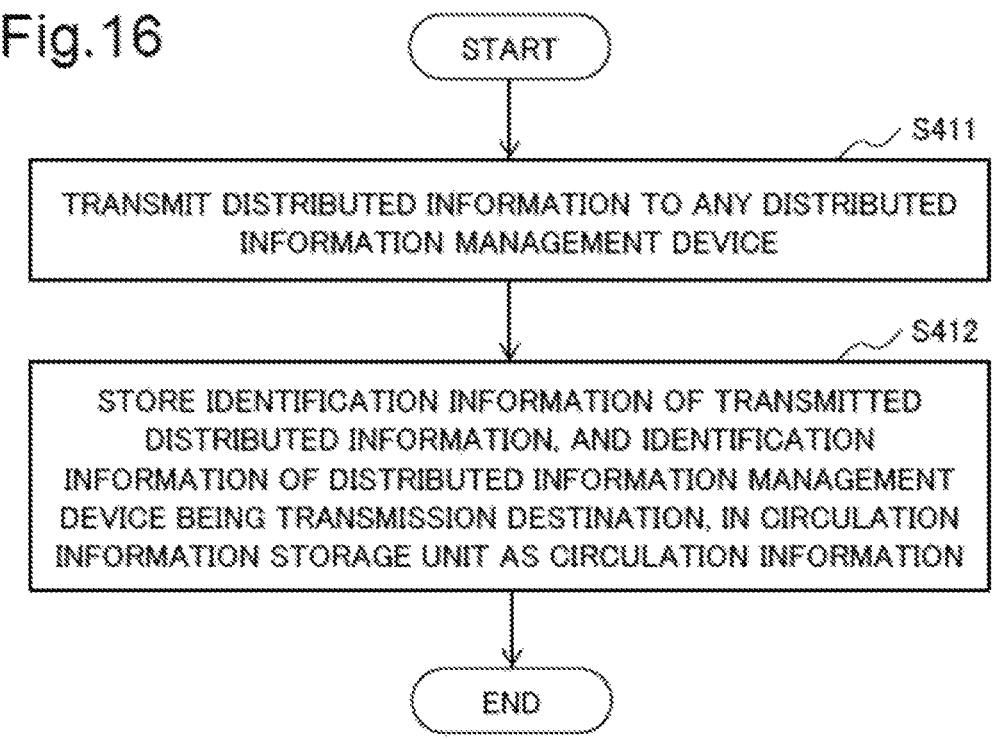
FIG. 16 is a flowchart for describing a management method of circulation information by the information processing device according to the third example embodiment of the present invention.

FIG. 16 is a flowchart for describing a circulation information management method by the information processing device 30.

In FIG. 16, first, the distributed information transmission unit 36 transmits distributed information to any one of a plurality of distributed information management devices (step S411). Next, the distributed information transmission unit 36 stores identification information of the transmitted distributed information, and identification information of a distributed information management device being a transmission destination, in the circulation information storage unit 37 as circulation information (step S412).

The above is a description regarding the circulation information management method by the information processing device 30 according to the present example embodiment. Note that the processing along the flowchart in FIG. 16 is one example, and does not limit the operation relating to the circulation information management method by the information processing device 30 to an unchanged procedure.

[Distributed Information Consolidation Method]

Figure 17:
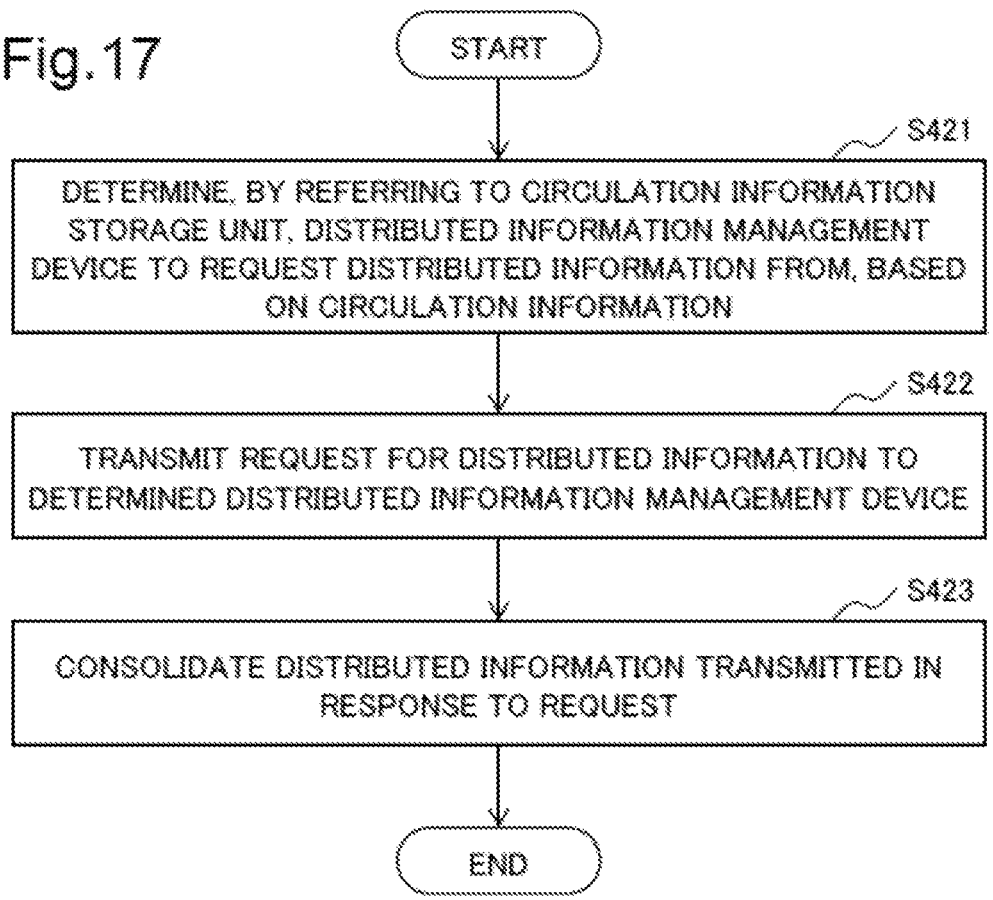
FIG. 17 is a flowchart for describing a consolidation method of distributed information by the information processing device according to the third example embodiment of the present invention.

FIG. 17 is a flowchart for describing a distributed information consolidation method by the information processing device 30. The processing along the flowchart in FIG. 17 relates to an operation of consolidating distributed information from a plurality of distributed information management devices.

In FIG. 17, first, the second encryption key construction unit 12 determines, by referring to the circulation information storage unit 37, a distributed information management device to request distributed information from, on the basis of circulation information stored in the circulation information storage unit 37 (step S421).

The second encryption key construction unit 12 transmits a request for distributed information to the determined distributed information management device (step S422).

The second encryption key construction unit 12 consolidates distributed information transmitted in response to the request (step S423).

The above is a description regarding the distributed information consolidation method by the information processing device 30 according to the present example embodiment. Note that the processing along the flowchart in FIG. 17 is one example, and does not limit the operation relating to the distributed information consolidation method by the information processing device 30 to an unchanged procedure.

As above, in the information processing device according to the present example embodiment, circulation information of distributed information of a second encryption key is managed. Thus, according to the information processing device in the present example embodiment, a second encryption key construction unit enables to appropriately consolidate distributed information distributed to and then managed in a plurality of distributed information management devices, and construct a second encryption key.

Fourth Example Embodiment

Next, an information processing system according to a fourth example embodiment of the present invention is described with reference to the drawings. The information processing system according to the present example embodiment is an IoT system including at least one of the information processing devices according to the first to third example embodiments as an edge. The information processing device in the information processing system according to the present example embodiment may be configured by any one kind of the information processing devices according to the first to third example embodiments, or may be configured by combining some kinds of information processing devices according to the first to third example embodiments in any way.

Figure 18:
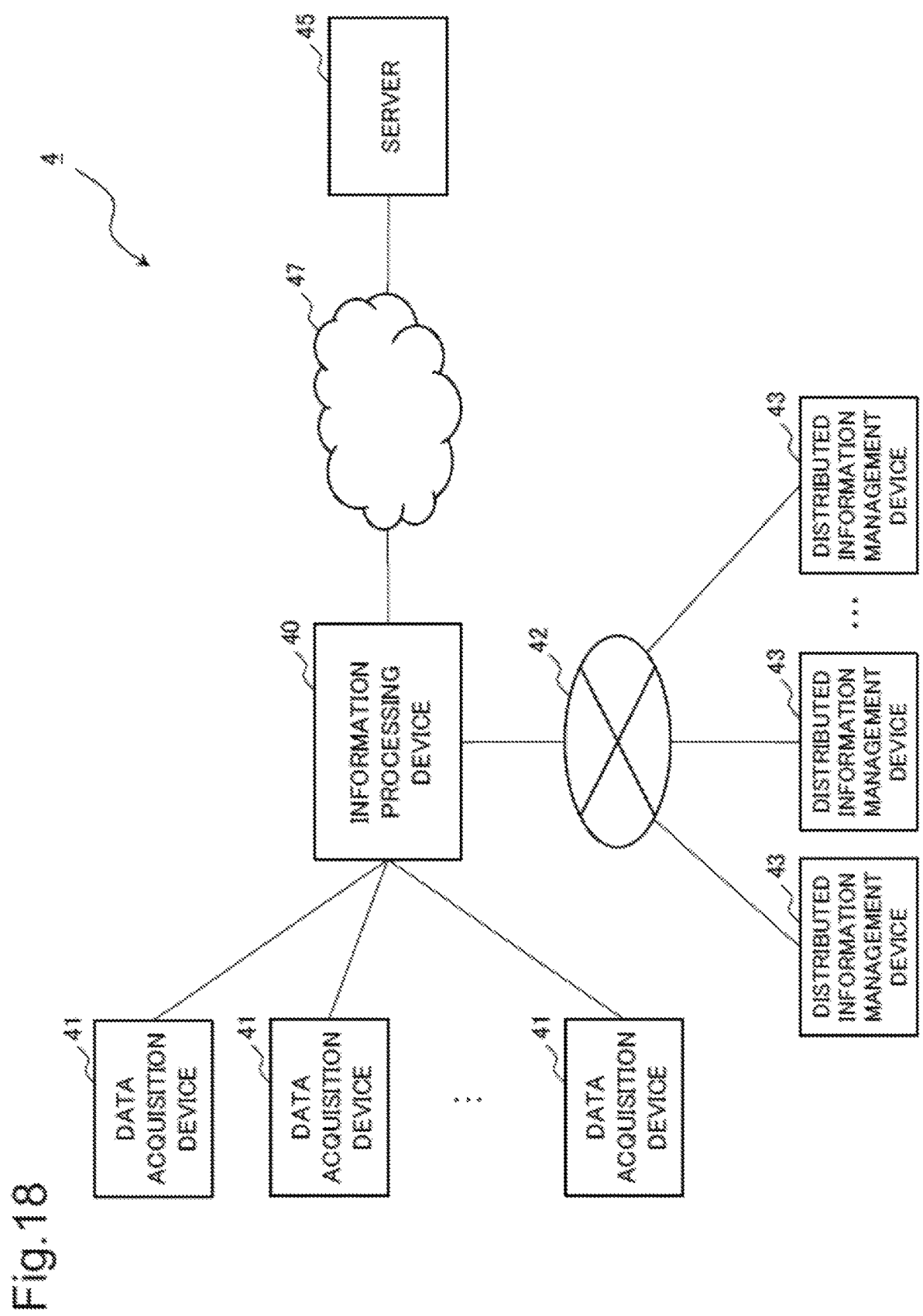
FIG. 18 is a conceptual diagram illustrating one example of a configuration of an information processing system according to a fourth example embodiment of the present invention.

FIG. 18 is a conceptual diagram for describing a configuration of an information processing system 4 according to the present example embodiment. The information processing system 4 includes an information processing device 40, at least one data acquisition device 41, a local network 42, a plurality of distributed information management devices 43, and a server 45. The information processing device 40 and the server 45 are connected to each other via a network 47 such as the Internet or an intranet. Note that, when the network 47 is configured as a local network, the network 47 may be added to the information processing system 4.

The information processing device 40 is connected to a plurality of data acquisition devices 41 being capable of data communication by wireless communication or wired communication. Moreover, the information processing device 40 is connected to the server 45 via the network 47. The information processing device 40 is at least one of the information processing devices according to the first to third example embodiments. The information processing device 40 receives data acquired by a plurality of data acquisition devices 41. The information processing device 40 applies processing to the data from the plurality of data acquisition devices 41, and transmits the processed data to the server 45 via the network 47. It is preferable that the information processing device 40 transmits, to the server 45, data from the plurality of data acquisition devices 41 after bundling the data.

The information processing system 4 may be configured by a single information processing device 40 or may be configured by a plurality of information processing devices 40. When there are a plurality of information processing devices 40 that configure the information processing system 4, the information processing devices 40 may be data-communicably connected to one another.

The data acquisition device 41 is connected to the information processing device 40 being capable of data communication by wireless communication or wired communication. The data acquisition device 41 is a device which acquires various kinds of information measured in an installed environment. The data acquisition device 41 converts acquired information into an electric signal (data) and then transmits the electric signal (data) to the information processing device 40. For example, the data acquisition device 41 is implemented by a sensor such as a temperature sensor, a humidity sensor, a pressure sensor, a light sensor, a geomagnetic sensor, a global positioning system (GPS), an acceleration sensor, a gyro sensor, an image sensor, a sound sensor, or a distance sensor. Note that, regardless of these sensors, the data acquisition device 41 has only to be a device which acquires some information, converts the information into an electric signal (data), and then transmits the electric signal (data) to the information processing device 40.

The local network 42 is a local network which wirelessly or wiredly connects the information processing device 40 and the plurality of distributed information management devices 43.

The distributed information management device 43 is connected to the information processing device 40 via the local network 42. Distributed information for constructing a second encryption key is stored in the distributed information management device 43. When the information processing device 40 constructs a second encryption key, the distributed information management device 43 transmits distributed information to the information processing device 40.

The server 45 is connected to the information processing device 40 via the network 47. The server 45 receives data transmitted from the information processing device 40, and stores and processes the received data. The server 45 is a computer placed in a data center, a server room, or the like, or an application.

The above is a description regarding the configuration of the information processing system 4 according to the present example embodiment. Note that the information processing system 4 is not limited to the configuration illustrated in FIG. 18 as long as the information processing system 4 achieves an IoT system. In particular, it is preferable that the information processing system 4 is configured in such a way as to achieve an IoT system which enables edge computing.

As above, the information processing system according to the present example embodiment includes at least one of the information processing devices according to the first to third example embodiments, a local network, at least one of the distributed information management devices according to the first to third example embodiments. Further, the information processing system according to the present example embodiment includes a data acquisition device data-communicably connected to the information processing device, and a server connected to the information processing device via a network. The data acquisition device transmits data measured in an installed environment to the information processing device. The server receives data transmitted from the information processing device, and executes processing using the received data.

By applying the information processing system according to the present example embodiment to an IoT system, both autonomous reactivation of an edge and encryption of information are accomplished even when an information processing device (also referred to as an edge) is not stably connected to a network. Thus, the present example embodiment enables to provide secure and continuous running of an IoT system.

(Hardware)

Figure 19:
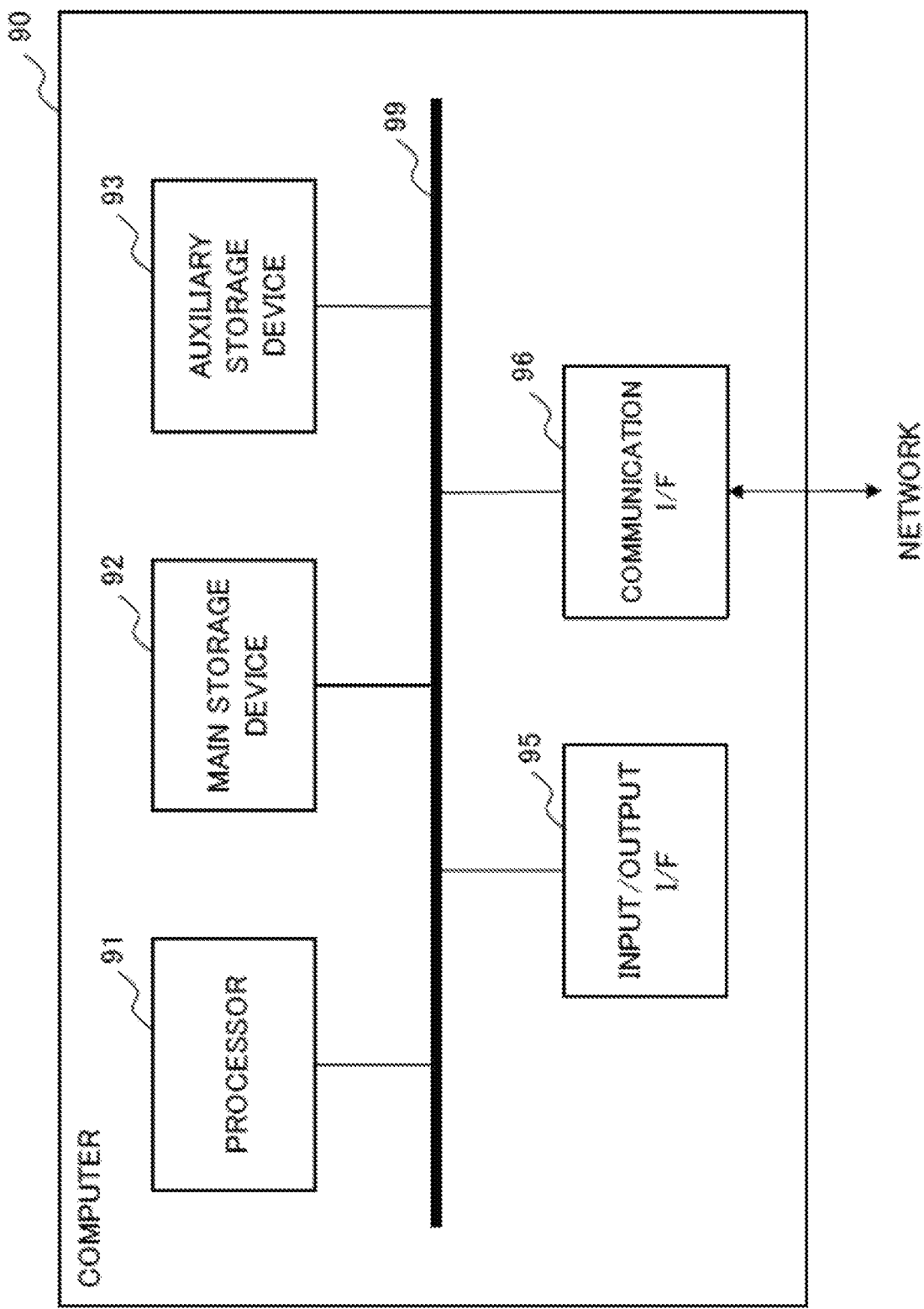
FIG. 19 is a block diagram illustrating one example of a hardware configuration which implements the information processing device according to each of the first to third example embodiments of the present invention.

Herein, a hardware configuration which executes processing of the information processing device according to each of the example embodiments of the present invention is described by citing an information processing device 90 in FIG. 19 as one example. Note that the information processing device 90 in FIG. 19 is a configuration example for executing processing of the information processing device according to each of the example embodiments, and does not limit the scope of the present invention.

As in FIG. 19, the information processing device 90 includes a processor 91, a main storage device 92, an auxiliary storage device 93, an input/output interface 95, and a communication interface 96. In FIG. 19, an interface is expressed as "I/F" for brevity. The processor 91, the main storage device 92, the auxiliary storage device 93, the input/output interface 95, and the communication interface 96 are data-communicably connected to one another via a bus 99. Further, the processor 91, the main storage device 92, the auxiliary storage device 93, and the input/output interface 95 are connected to a network such as the Internet or an intranet via the communication interface 96.

The processor 91 expands a program stored in the auxiliary storage device 93 or the like in the main storage device 92, and executes the expanded program. In the present example embodiment, a configuration using a software program installed in the information processing device 90 has only to be provided. The processor 91 executes processing by the information processing device according to the present example embodiment.

The main storage device 92 has an area where a program is expanded. The main storage device 92 has only to be a volatile memory such as a dynamic random access memory (DRAM), for example. Moreover, a non-volatile memory such as a magnetoresistive random access memory (MRAM) may be configured and added as the main storage device 92.

The auxiliary storage device 93 stores various data. The auxiliary storage device 93 is configured by a local disc such as a hard disc or a flash memory. Note that it is also possible to provide a configuration which stores various data in the main storage device 92, and omit the auxiliary storage device 93. For example, secure storages 11, 21, and 31 included in each of information processing devices 10, 20, and 30 according to each of first to third example embodiments are constructed in the auxiliary storage device 93. For example, each of encrypted file system 14, 24, and 34 included in each of information processing devices 10, 20, and 30 according to each of first to third example embodiments are constructed in the auxiliary storage device 93.

The input/output interface 95 is an interface for connecting the information processing device 90 to peripheral equipment. The communication interface 96 is an interface for connecting to an external system or device through a network such as the Internet or an intranet, based on a standard or a specification. The input/output interface 95 and the communication interface 96 may be formed as a common interface for connecting to external equipment.

Furthermore, the information processing device 90 may be equipped with display equipment for displaying information. When equipped with display equipment, the information processing device 90 is preferably provided with a display control device (not illustrated) for controlling display of the display equipment. Display equipment has only to be connected to the information processing device 90 via the input/output interface 95.

Still further, the information processing device 90 may be equipped with a disc drive according to need. The disc drive is connected to the bus 99. Between the processor 91 and an unillustrated recording medium (program recording medium), the disc drive mediates reading of a data program from a recording medium, writing of a processing result of the information processing device 90 into the recording medium, and the like. A recording medium can be implemented by an optical recording medium such as a compact disc (CD) or a digital versatile disc (DVD). Moreover, a recording medium may be implemented by a semiconductor recording medium such as a universal serial bus (USB) memory or a secure digital (SD) card, a magnetic recording medium such as a flexible disc, or another recording medium.

The above is one example of a hardware configuration for enabling the information processing device according to each of the example embodiments of the present invention. Note that the hardware configuration in FIG. 19 is one example of a hardware configuration for executing calculation processing of the information processing device according to each of the example embodiments, and does not limit the scope of the present invention. Additionally, a program which causes a computer to execute processing relating to the information processing device according to each of the example embodiments also falls within the scope of the present invention. Further, a program recording medium recording a program according to each of the example embodiments also falls within the scope of the present invention.

Components of the information processing device according to each of the example embodiments can be combined in any way. Moreover, a component of the information processing device according to each of the example embodiments may be implemented by software, or may be implemented by a circuit.

An example advantage according to the invention is to provide an information processing device which accomplishes both autonomous reactivation of an edge and encryption of information and enables secure and continuous running of an IoT system, without being stably connected to a network.

While the invention has been particularly shown and described with reference to example embodiments thereof, the invention is not limited to these embodiments. It will be understood by those of ordinary skill in the art that various changes in form and details may be made therein without departing from the spirit and scope of the present invention as defined by the claims.

The invention claimed is:

1. An information processing device comprising:
a secure storage which includes an access limit area accessible by only trusted software executed in the information processing device, and in which a first encryption key keeping area keeping a first encryption key is configured inside the access limit area;
an encrypted file system including an encrypted area recording processing target data encrypted by a common encryption key which is encrypted by the first encryption key that encrypts the common encryption key into a second encryption key;
at least one memory storing instructions; and
at least one processor connected to the at least one memory and configured to execute the instructions to:
consolidate, in response to activation of the information processing device, a plurality of pieces of distributed information via a local network from a plurality of distributed information management devices distributedly storing the plurality of pieces of distributed information for constructing the second encryption key configured to be divided into the plurality of pieces of distributed information that are distributedly kept in the plurality of distributed information management devices;
construct the second encryption key by using the plurality of pieces of consolidated distributed information;
cause the trusted software to acquire, in line with construction of the second encryption key, the first encryption key from the first encryption key keeping area;
cause the trusted software to construct the common encryption key by decrypting the second encryption key using the first encryption key; and
cause the trusted software to set up, by using the common encryption key, the encrypted file system in such a way as to be accessible from any software.

2. The information processing device according to claim 1, wherein at least one processor is configured to execute the instructions to:
acquire the second encryption key;
verify whether a transmission source of the acquired second encryption key is a valid process,
acquire the first encryption key from the first encryption key keeping area when the transmission source of the acquired second encryption key is a valid process;
construct the common encryption key by using the first encryption key and the second encryption key being acquired; and
set up the encrypted file system in such a way as to be accessible from any software by using the constructed common encryption key.

3. The information processing device according to claim 2, wherein the at least one processor is configured to execute the instruction to record the processing target data encrypted for each file by the common encryption key.

4. The information processing device according to claim 2, wherein
the access limit area includes a signature information storage area which is configured to store signature information for the trusted software being generated by using a signature key generated under a predetermined rule, based on a third encryption key, and the access limit area is encrypted by a fourth encryption key being configured under the predetermined rule by the third encryption key, and serving to encrypt and decrypt data encrypted inside the access limit area, and the at least one processor is configured to execute the instructions to:
store the third encryption key in a tamper resistance information storage area which is limited in overwriting and reading from outside;
operate a trusted operating system which verifies trusted software by using the trusted software signature and the third encryption key, operates only the trusted software determined to be valid, and enables reading and writing of the trusted software and the access limit area; and
provide a function of communication between the trusted software included in the access limit area and any software through an interface.

5. The information processing device according to claim 4, wherein the at least one processor is configured to execute the instructions to:
acquire the second encryption key;
acquire the third encryption key from the tamper resistance information storage area in line with acquisition of the second encryption key;
decrypt the encrypted signature information stored in the signature information storage area by using the acquired third encryption key;
verify reliability of software inside by using the decrypted signature information; and
operate the trusted software based on the verified result.

6. The information processing device according to claim 2, wherein the at least one processor is configured to execute the instructions to:
transmit, to a storage destination, the plurality of pieces of distributed information distributed from the second encryption key;
store circulation information which includes identification information of the distributed information transmitted to a transmission destination of the distributed information, and identification information of the transmission destination of the distributed information, in a circulation information storage area;
determine, by referring to the circulation information storage area, a storage destination to which the distributed information is requested, based on the circulation information stored in the circulation information storage area; and
transmit a request for the distributed information to the determined storage destination, and consolidates the distributed information transmitted in response to the request.

7. An information processing system comprising:
the information processing device according to claim 1;
a plurality of distributed information management devices configured to store each of a plurality of pieces of distributed information for constructing a second encryption key being a common encryption key encrypted by a first encryption key; and
a local network configured to connect the plurality of distributed information management devices and the information processing device to one another.

8. An information processing system comprising:
the information processing device according to claim 1;
a plurality of distributed information management devices configured to store each of a plurality of pieces of distributed information for constructing a second encryption key being a common encryption key encrypted by a first encryption key;

a local network configured to connect the plurality of distributed information management devices and the information processing device to one another;

at least one data acquisition device configured to be data-communicably connected to the information processing device, and transmit data measured in an installed environment to the information processing device; and a server configured to be connected to the information processing device via a network being different from the local network, receive data transmitted from the information processing device, and execute processing using the received data.

9. An information processing method by an information processing device including a secure storage which includes an access limit area accessible by only trusted software executed in the information processing device, and in which a first encryption key keeping area keeping a first encryption key is configured inside the access limit area, and an encrypted file system including an encrypted area recording processing target data encrypted by a common encryption key which is encrypted by the first encryption key that encrypts the common encryption key into a second encryption key, the method comprising;

consolidating, in response to activation of the information processing device, a plurality of pieces of distributed information via a local network from a plurality of distributed information management devices distributedly storing the plurality of pieces of distributed information for constructing the second encryption key being a common encryption key encrypted by a first encryption key, the second encryption key is configured to be divided into the plurality of pieces of distributed information that are distributedly kept in the plurality of distributed information management devices;

constructing the second encryption key by using the plurality of pieces of consolidated distributed information;

causing the trusted software to acquire, in line with construction of the second encryption key, the first encryption key kept in first encryption key keeping area inside an access limit area accessible by only the trusted software;

causing the trusted software to construct the common encryption key by decrypting the second encryption key using the first encryption key; and causing the trusted software to set up, by using the common encryption key, an encrypted file system including an encrypted area recording processing target data encrypted by the common encryption key, in such a way as to be accessible from any software.

10. A non-transitory recording medium recording a program for controlling an information processing device including a secure storage which includes an access limit area accessible by only trusted software executed in the information processing device, and in which a first encryption key keeping area keeping a first encryption key is configured inside the access limit area, and an encrypted file system including an encrypted area recording processing target data encrypted by a common encryption key which is encrypted by the first encryption key that encrypts the common encryption key into a second encryption key, the program causes the information processing device to execute:

processing of consolidating, in response to activation of the information processing device, a plurality of pieces of distributed information via a local network from a plurality of distributed information management devices distributedly managing the plurality of pieces of distributed information for constructing the second encryption key being a common encryption key encrypted by a first encryption key, the second encryption key is configured to be divided into the plurality of pieces of distributed information that are distributedly kept in the plurality of distributed information management devices;

processing of constructing the second encryption key by using the plurality of pieces of consolidated distributed information;

processing of acquiring, in line with construction of the second encryption key, the first encryption key kept in first encryption key keeping area inside an access limit area accessible by only the trusted software;

processing of causing the trusted software to construct the common encryption key by decrypting the second encryption key using the first encryption key; and processing of causing the trusted software to set up, by using the common encryption key, an encrypted file system including an encrypted area recording processing target data encrypted by the common encryption key, in such a way as to be accessible from any software.

* * * * *